(12) United States Patent
Quan

(10) Patent No.: US 6,826,352 B1
(45) Date of Patent: Nov. 30, 2004

(54) DYNAMIC VIDEO COPY PROTECTION SYSTEM

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/538,107

(22) Filed: Mar. 29, 2000

(51) Int. Cl.[7] .............................................. H04N 5/91
(52) U.S. Cl. ....................................... 386/94; 380/203
(58) Field of Search .......................... 386/46, 94, 95; 380/203, 204; 360/5

(56) References Cited

U.S. PATENT DOCUMENTS

| | | | | |
|---|---|---|---|---|
| 5,133,008 A | * | 7/1992 | Fujita | 380/204 |
| 5,134,496 A | * | 7/1992 | Schwab et al. | 386/94 |
| 5,583,936 A | * | 12/1996 | Wonfor et al. | 380/204 |
| 5,633,927 A | * | 5/1997 | Ryan et al. | 380/204 |
| 6,295,360 B1 | * | 9/2001 | Ryan et al. | 380/54 |
| 6,411,713 B1 | * | 6/2002 | Ryan | 380/203 |

FOREIGN PATENT DOCUMENTS

WO        WO 98/04084        *  1/1998

* cited by examiner

Primary Examiner—Huy Nguyen
(74) Attorney, Agent, or Firm—George Almeida

(57) ABSTRACT

Copy protection normally included in a video signal to prevent unauthorized copying is dynamically modified, by changing an attribute of the copy protection to be added to or present in the video signal. The copy protection can include any signal that affects playability of an attenuated video signal, for example, by triggering an early or late horizontal or vertical retrace (such as caused by sync narrowing or the checker signals described in U.S. Pat. No. 5,583,936). The attribute change is related to scene content carried by the video signal, so that bright and dark scenes carry different copy protection. The attribute being changed can be, for example a checker's low level that is reduced to below the blanking level when the scene content is darker than normal, and increased to above the blanking level when the scene content is brighter than normal. Alternatively, the attribute being changed can be the width of a synchronization pulse normally present in the video signal. The brightness of a scene carried by the video signal can be measured directly, or alternatively as the change in attenuation in the synchronization pulse received at the input of a sync separator of a typical VCR or TV set.

53 Claims, 18 Drawing Sheets

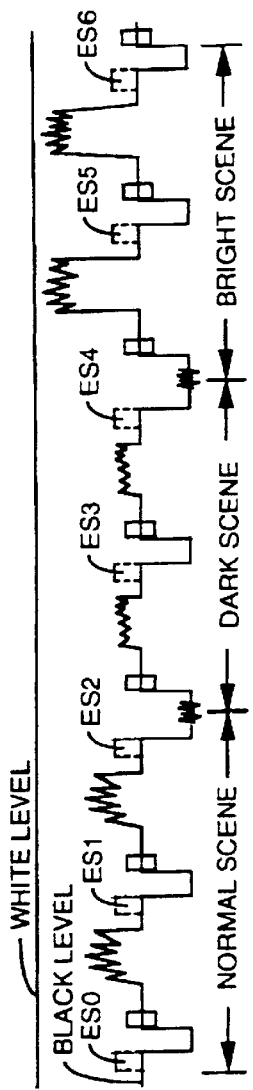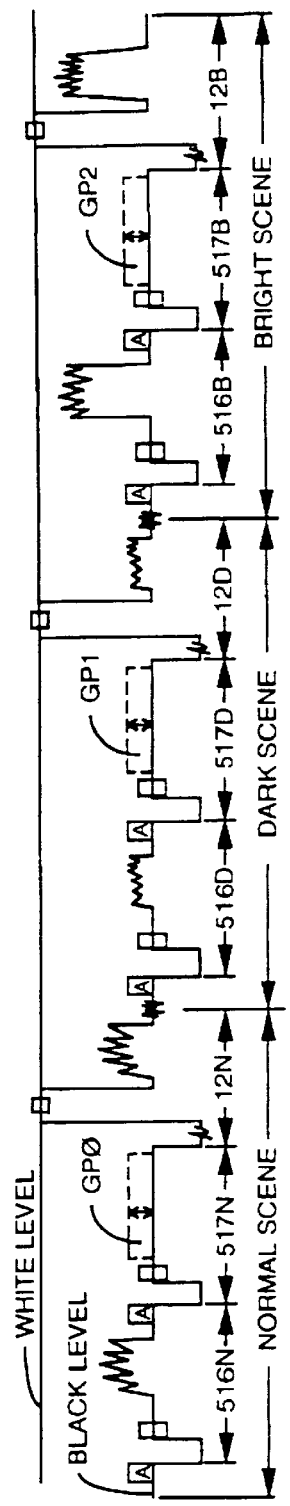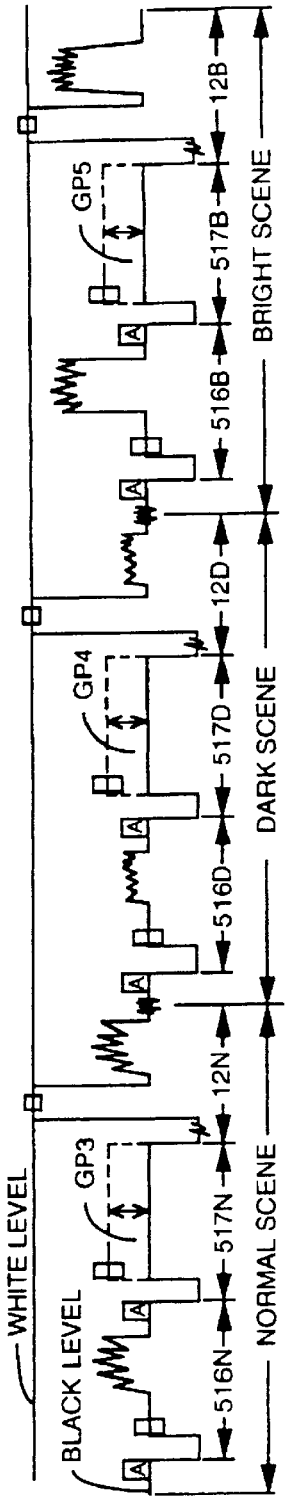
FIG. 1A (PRIOR ART)
FIG. 1B (PRIOR ART)
FIG. 1C (PRIOR ART)

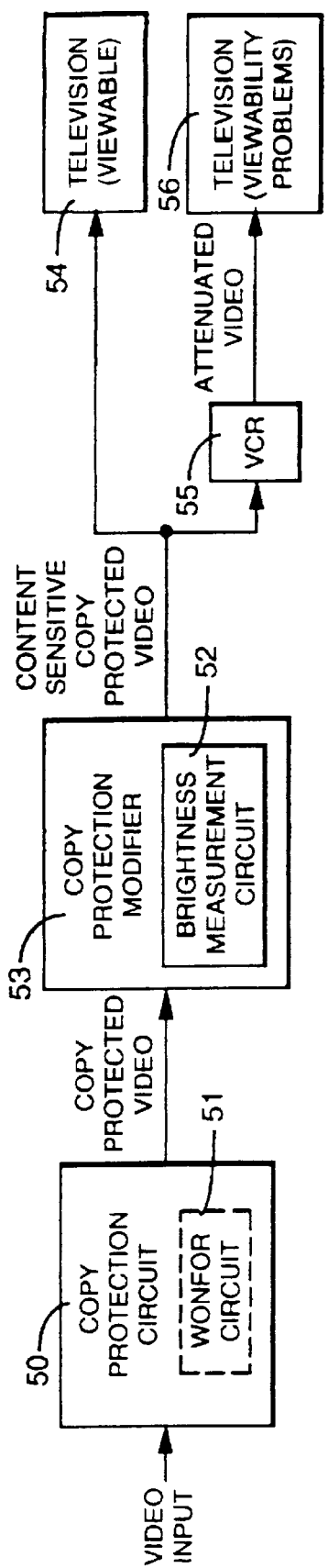
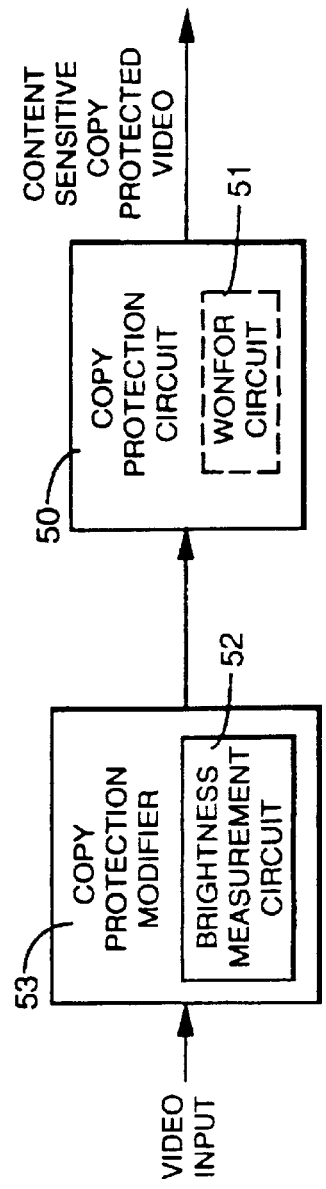
FIG. 2A
FIG. 2B

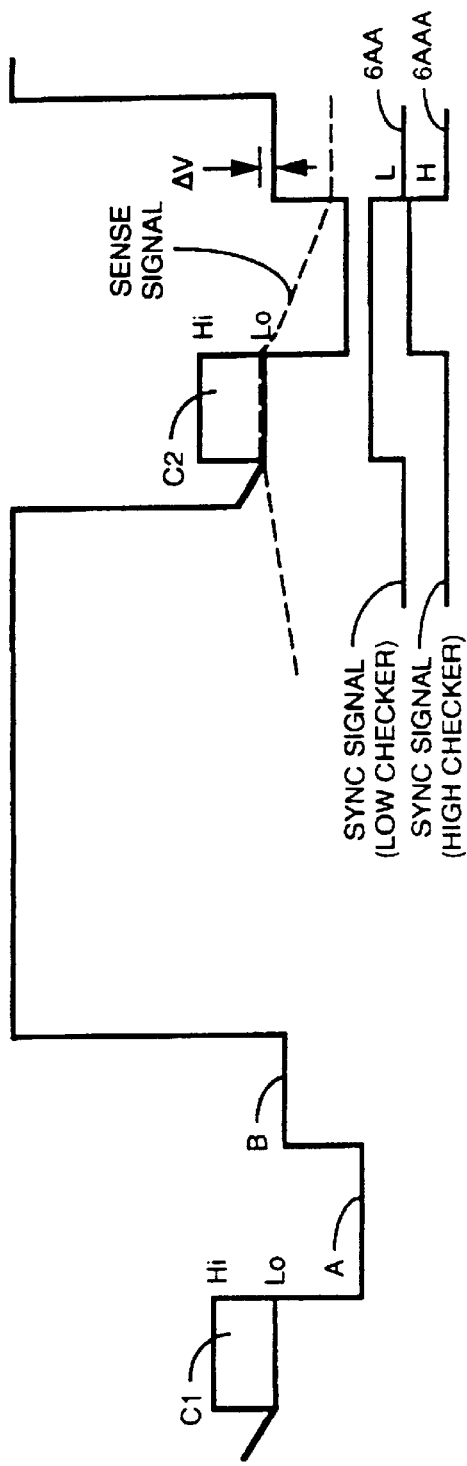
FIG. 6A (NORMAL SCENE)
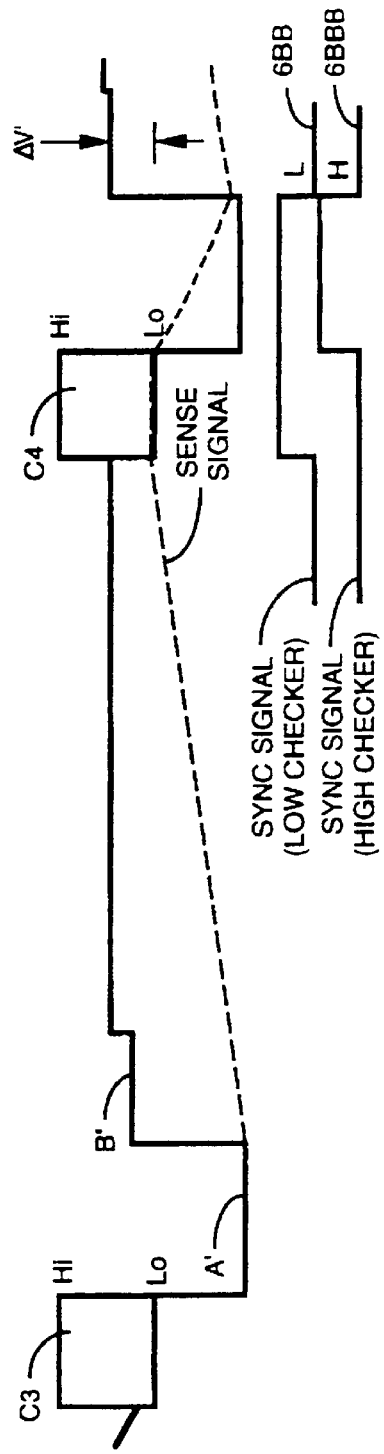
FIG. 6B (DARK SCENE)

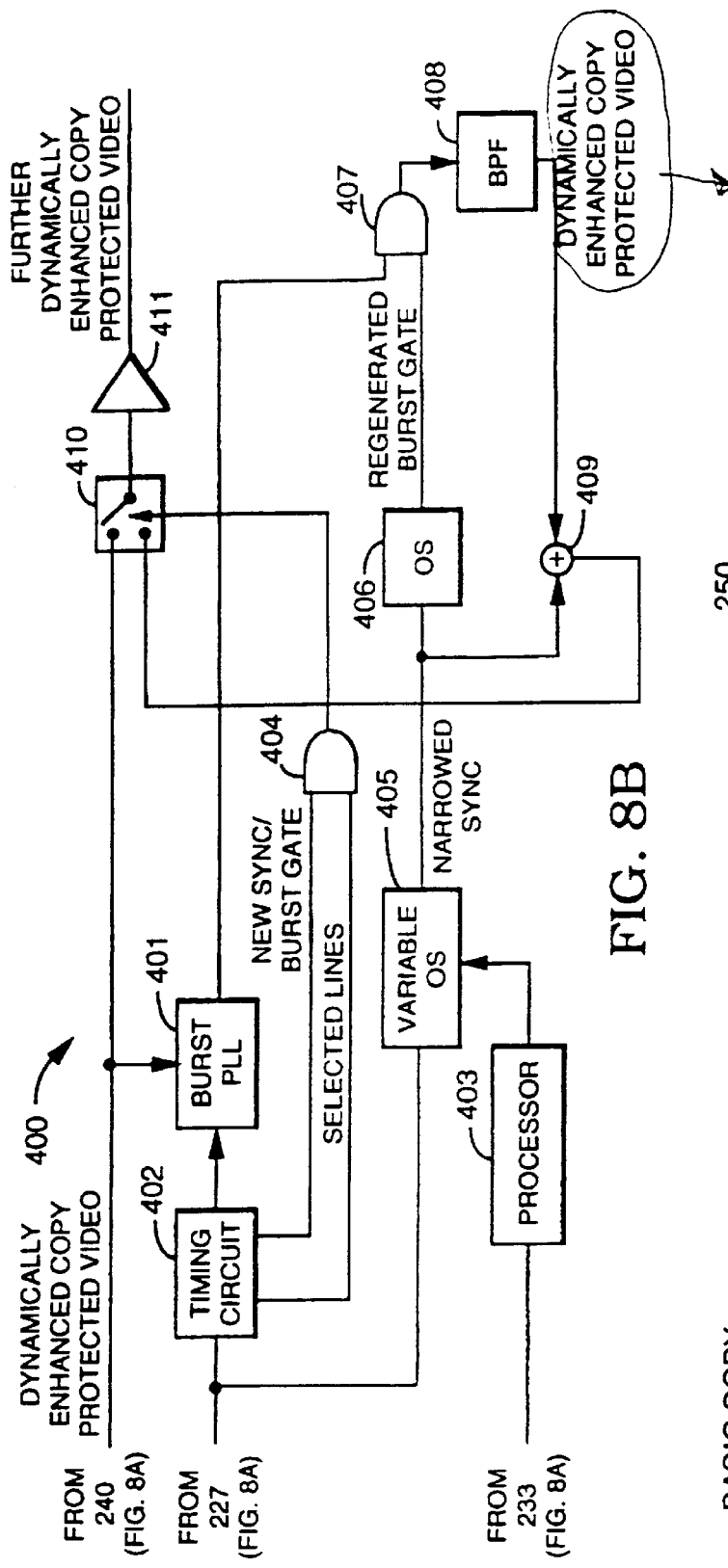
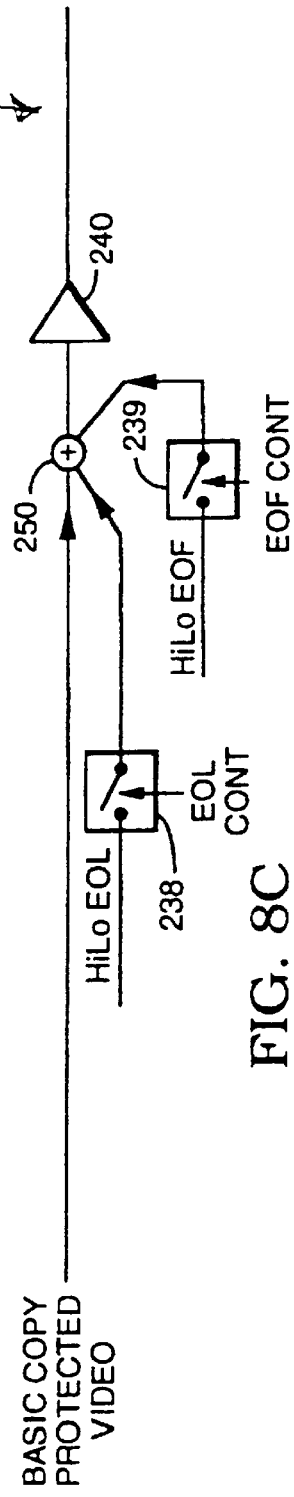
FIG. 8B
FIG. 8C

DYNAMIC VIDEO COPY PROTECTION SYSTEM

BACKGROUND OF THE INVENTION

Conventional videotape recorders have an automatic gain control circuit which measures the level of a pulse (called "sync pulse") in a video signal. The circuit uses the measured level to develop a gain correction signal that is used to keep the video level applied to an FM modulator in the videotape recording system (VCR) at a fixed, predetermined value. It is conventional to prevent unauthorized copying of a videotape, by use of the fact that such a circuit of a videotape recorder is sensitive to pulses added to a normal video signal to prevent copying as described in, for example U.S. Pat. No. 4,631,603 granted to Ryan (i.e., Ryan '603, that is incorporated by reference herein in its entirety).

U.S. Pat. No. 5,583,936 granted to Wonfor et al. (i.e., Wonfor '946, also incorporated by reference herein in its entirety) describes a number of enhancements (hereinafter "retrace enhancers") to a video anti-copying process of the type described above or to anti-copy processes that cause attenuation (as described in e.g. U.S. Pat. Nos. 5,130,810 and 4,918,098 granted to Ryan (Ryan '810 and '098) and 4,163,253 granted to Morio et al. (Morio '253). Specifically, Wonfor '936 describes e.g. introduction into the overscan portion of the television picture, just prior to the horizontal or vertical sync signals but in active video, a negative going waveform that appears to the television receiver (TV set) or videotape recorder (VCR) to be a sync signal, thereby causing an early horizontal or vertical retrace.

One version provides a waveform (called horizontal retrace enhancer) in the right overscan portion of the picture, that results in a checker pattern of alternating gray and black areas (illustrated in FIG. 1A as ES0–ES6). This causes the TV set on which the illegal copy is played to horizontally retrace earlier than normal in selected lines, with a consequential horizontal shift of the picture information on those lines. This substantially degrades picture playability. In another version, another waveform (called vertical retrace enhancer) introduces a gray pattern (illustrated in FIGS. 1B and 1C as GP0 –GP2 and GP3–GP5 respectively) at the bottom overscan portion of the picture, which causes vertical picture instability (also called "jitter"). It is noted that the features in the waveforms of FIGS. 1A–1C designated as ES0–ES6, GP0–GP2 and GP3–GP5, are illustrated in dashed lines to indicate that the video levels thereof are variable.

Circuitry 10 for inserting the above-described horizontal and vertical retrace enhancers is shown in block form in FIG. 1D. The main video signal path includes an input clamp amplifier A1 (or DC restored amplifier), a sync pulse narrowing circuit 13, a mixing point 15 at which the waveform components of the checker pattern and the vertical modification (jitter inducing) waveforms are added, and an output line driver amplifier A2. Amplifier A1 ensures that the video signal at blanking is at a known pre-determined DC level before adding any additional waveform components to that video signal. The resulting clamped video signal is applied to mixing point 15 with a source impedance Ro, typically greater than 1000 ohms. In this case also the video input signal into circuit 10 of FIG. 1D may have the last 9 lines of each field blanked to a reference level. U.S. Pat. No. 4,695,901(i.e., Ryan '901, incorporated by reference herein in its entirety) shows a switching circuit for blanking.

A process control and signal generation path includes a sync separator 11, a control circuit 12, circuits VR1–VR4 to generate the required signal voltages which will be added to the main video signal, and a switch selection system 14-1 through 14-4 which applies the required signal voltages to the mixing point 15 under the control of the control circuit 12. That is, the retrace enhancers to be injected are applied to the mixing point 15 with a source impedance typically less than 50 ohms. The input video is DC restored by the input video clamp amplifier A1.

When it is required to modify the input video signal, for example with a checker component, the appropriate signal is selected and applied to the mixing point 15 at the low source impedance, which overrides the input video signal from amplifier A1 and effectively replaces the input video signal with the required signal. When the input signal is to remain unchanged, the switch elements 14-1 to 14-4 are all in the open state, with the result that the video signal passes unchanged to the output line driver amplifier A2. The resulting video signal at the mixing point 15 is applied to line driver amplifier A2 to provide standard output signal level and output impedance. Sync separator 11 provides composite sync pulses and a frame identification signal required by the process control circuit 12. The process control circuit 12 generates control signals to turn on the signal selection switches 14-1 to 14-4 at the precise time and for the required duration that the various signals, that is, the horizontal or vertical retrace enhancers, are to replace the input video signal.

Various signals which replace the input video signal consist preferably of a high or low steady state DC signal level. For example the checker signal "high level" is a mid-gray level, typically of about 30% of peak white, whereas the checker signal "low level" is black level or blanking level. These various level signals are generated from potentiometers VR1, VR2, VR3, VR4 (or alternatively from voltage divider resistors for fixed preset signal levels) connected across appropriate supply voltage lines. These signals are applied to the corresponding selection switch elements 14-1, 14-2, 14-3, 14-4 via unity gain operational amplifiers to ensure the required low output impedance into the mixing point 15.

Control circuit 12 generates the appropriate switch selection control pulses for addition of the horizontal and vertical retrace enhancers (see FIGS. 3A–3C). Checker pulses (horizontal retrace enhancers) are applied only to selected lines. One example starts the checker pattern at the tenth line containing picture information, that is, after the end of vertical blanking and ends it ten lines before the last line containing picture information, that is, 10 lines before the start of the succeeding vertical blanking interval. Similarly, the vertical jitter signals (vertical retrace enhancers) are applied only to selected lines, for example the last nine lines prior to the vertical blanking interval. Hence, both the checker pattern and vertical jitter signals require control signals with both horizontal and vertical rate components.

The video input signal also is buffered by the amplifier A3 and is coupled to the sync separator 11 which provides the composite sync pulses and frame identification (e.g., square wave) signals of previous mention. The composite sync pulses are applied to a phase-locked loop (PLL) located in the control circuit 12. The phase control of the PLL using a potentiometer is adjusted so that the horizontal rate output pulse starts at the required start point of the checker, typically two microseconds before the start of horizontal blanking. The output signal of the PLL is used to derive the horizontal rate component of both the checker and vertical modification signals.

A burst gate output signal from the sync separator 11 is inverted by an inverter U5 which provides a clamping pulse for clamp amplifier A1. It is to be understood that the circuit 10 (FIG. 1D) can be coupled to receive an input signal from a circuit that implements an attenuation-based anti-copy process.

Wonfor '936 describes a sync pulse narrowing circuit and method that is used by itself or in cascade (as shown in Wonfor's FIG. 6a block 96; see also FIGS. 13A, 13B, 14A and 14B) with any other signal modification techniques. The method narrows the video signal sync (synchronization) pulses, mainly the horizontal sync pulses, so that when an illegal copy is made, the attenuated video with reduced sync pulse width, that is, duration, causes a playability problem (also called "playability problem") when viewed on a TV set. This is because most TV set sync separators incorporate sync tip DC restoration. Because these TV set sync separators are typically driven by medium impedances, the sync pulses are partly clipped off. By narrowing the sync pulses, the sync pulses are even further clipped off. When an unauthorized copy is made of the video signal, especially with the above-described checker and/or end of field modification signal, the copy has a reduced amplitude video with reduced sync pulse width. As a result, the TV sync separator sees a severe loss in sync due to its own clipping from the narrowed sync width and the attenuation of the video itself. Thus, the TV set's sync separator does not "extract" sync properly and this causes the TV picture to be even less viewable, because the horizontal and/or vertical modification effects are more intense.

SUMMARY OF THE INVENTION

In accordance with the invention, an apparatus and method change at least one attribute of copy protection (for example, checker signals, sync narrowing, vertical jitter pulses, and/or sync amplitude changes) that is present in or is to be added to a video signal, to control the display of contents carried by the video signal, for example, the to-be-displayed audio or video contents. Changing one or more pulses, such as any sync pulse or the retrace enhancer as described above, in a manner that is not predetermined as described herein, enhances prior art methods. Such change is also called "dynamic change". For example, such dynamic alteration in accordance with the invention increases the effectiveness of copy protection during display of dark or less bright scenes so as to make more use than does the prior art, of the retrace enhancers and/or narrowed sync pulses, which may be otherwise not effective in dark or less bright scenes. The amount of dynamic change is selected to ensure that an unattenuated version of the video signal carrying the changed pulse(s) can be viewed in the normal manner, but an attenuated version of the video signal (e.g., a copy) causes playability problems. It should be noted that the modifier (i.e., dynamic) enhancement signals of the present invention, preferably are combined with a basic copy protection signal, for example, a modified video signal that causes a change in the automatic gain control (AGC) level in a VCR.

A dynamic change in copy protection that is made in one embodiment is related to a scene's content that is carried by the video signal. In one implementation, the attribute that is changed is the low level of a retrace enhancer, thereby making the retrace enhancer "scene content or brightness sensitive." In a first example of this implementation, a low level of a horizontal retrace enhancer is changed, such as a checker pattern that is added at the end of a line (EOL) as described in Wonfor '936, and the change is related to a property of the to-be-displayed scene, such as brightness or scene content (that is, average picture level, APL). In addition to or instead of changing a pulse related to an end of line (EOL) as described above, one or more attributes of a pulse related to an end of field (EOF) can also be dynamically changed depending on scene content carried by the video signal. Therefore, in a second example, the low level of a vertical retrace enhancer that is added to one or more groups of lines in the active video but in overscan region of a video signal, for example, an intermittently added peak white signal or mid gray signal as described in Wonfor '936, is changed. In the second example, depending on the variant, a color burst signal can be carried unmodified (i.e. at the low level), or can be carried at the high level by the vertical retrace enhancer being added.

BRIEF DESCRIPTION OF THE DRAWINGS

Throughout the following figures, like components, features, etc., in the figures are similarly numbered, whereas equivalent yet slightly different components, features, etc., are similarly numbered but include a prime or double prime symbol.

FIGS. 1A–1C illustrate prior art retrace enhancers ES0–ES6 and GP0–GP5, wherein the low state is at a fixed level.

FIGS. 2A–2D illustrate, in high level block diagrams, use of a brightness measurement circuit in accordance with the invention to dynamically enhance copy protection based on scene content carried by a video signal.

FIGS. 6A and 6B illustrate, for a normal scene and a dark scene respectively, the relation between the low and high levels of a retrace indicator in the video signal and the corresponding synchronization signals generated by use of an attenuated version of the video signal in a TV or VCR sync separator.

FIG. 8B illustrates, in a circuit diagram, another implementation of the circuitry illustrated in FIG. 7A wherein the sync pulse width is modified dynamically.

FIG. 8C illustrates an alternative implementation of the circuitry illustrated in FIG. 8A.

DESCRIPTION OF THE PREFERRED EMBODIMENTS

Figure 1D:
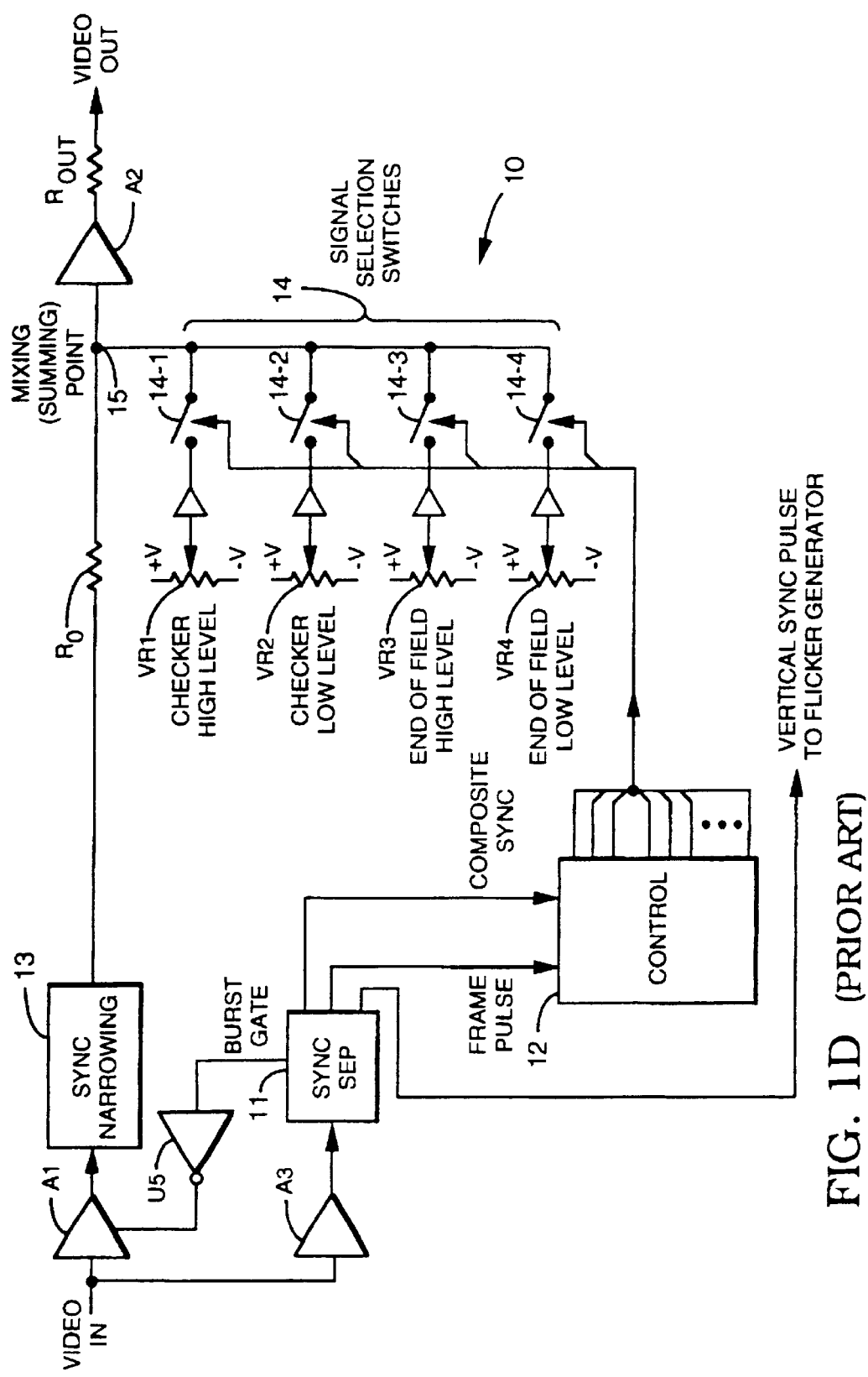
FIG. 1D illustrates, in an intermediate level block diagram, a copy protection enhancement circuit used in the prior art for adding retrace enhancers to a video signal or to a basic copy protected video signal.

The invention relates to a method and apparatus for dynamically changing copy protection that is normally added to a video signal over typically (but not necessarily) multiple frames of a video signal. Depending on the implementation, such a copy protection signal can be changed in selected lines of a frame, instead of being limited to a change across multiple frames. In the various embodiments, the dynamic change in copy protection is related to scene content or brightness (average picture level, APL) carried by the video signal. Such modified copy protection can increase the copy protection effect in scenes where the normally added basic copy protection, such as provided by Ryan '603 or '098, or Morio '253 which can be enhanced by Wonfor '936, is less effective than in the remaining scenes carried by the video signal, e.g. for dark scenes. An attribute of modified copy protection is selected to avoid affecting playability of an unattenuated video signal.

In one implementation illustrated in FIG. 2A, brightness of scene content carried by a video signal is measured directly or indirectly by a circuit 52, and the measured brightness is used to change an attribute of a copy protection signal included in the video signal. Specifically, a video signal that carries various scenes of, e.g. a movie, is copy protected in the normal manner by a copy protection circuit 50 that optionally includes a circuit 51 of the type described by Wonfor '936. In accordance with the invention, a copy protection modifier circuit 53 that optionally includes the brightness measurement circuit 52, dynamically modifies the copy protection depending on a property of the video signal. When the video signal generated by circuit 53 is viewed on a television 54, the picture is viewable in the normal manner. However, when such a video signal is recorded by a VCR 55 on a videotape, the signal is attenuated, and viewing of the attenuated signal on a television 56 results in playability problems.

Figures 2C, 2D:
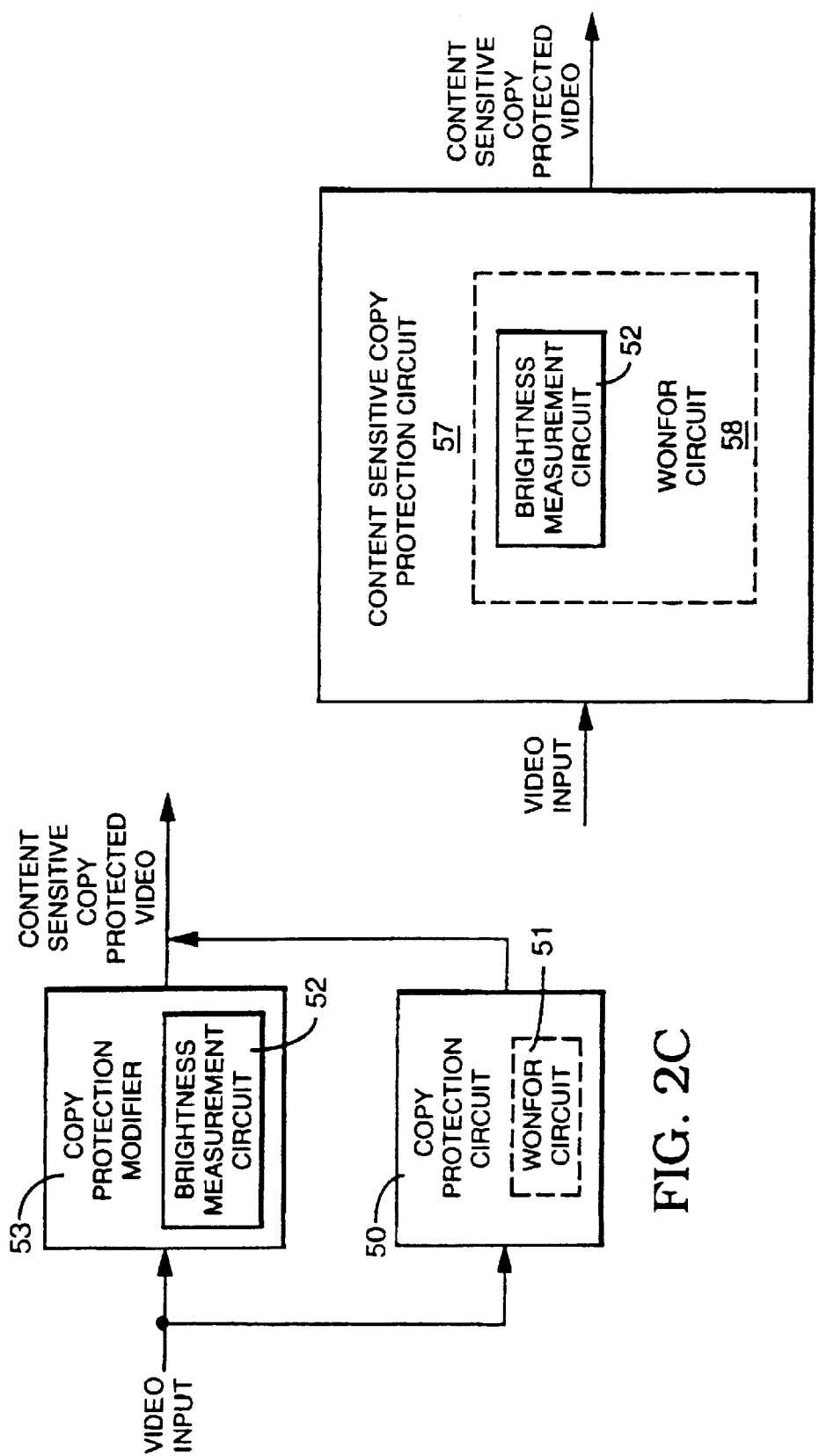

Depending on the embodiment, instead of brightness measurement circuit 52, another circuit sensitive to another attribute of content in the video signal (e.g. a digital signal in the VBI) can be used in the copy protection modifier circuit 53. Moreover, depending on the embodiment, copy protection modifier circuit 53 can be located upstream of copy protection circuit 50 as illustrated in FIG. 2B, or parallel to copy protection circuit 50 as illustrated in FIG. 2C. Note also that in another embodiment, a single circuit 57 (FIG. 2D) adds content-sensitive copy protection in a single step (instead of a two step process implemented by the circuits illustrated in FIGS. 2A–2C) by including therein, for example, the brightness measurement circuit 52. Therefore, depending on the embodiment, brightness measurement circuit 52 can be coupled in any manner (e.g. upstream of, downstream of, parallel to and integrated into) relative to a copy protection circuit such as the Wonfor '936 circuit (51).

Note that in one implementation, the average picture level is used as an indicator of brightness of scene content in the video signal. As used herein, average picture level (APL) denotes the average signal level during active picture time, expressed as a percentage of the difference between the blanking and reference white levels. The APL may be expressed with respect to e.g. a white level, wherein 100% APL denotes the white level.

Other variants of this implementation may include using, during the picture level measurement, automatic gain amplifiers from, for example, a typical VCR and/or typical sync separators from TV sets. In one such variant, a method locates pulses such as automatic gain control (AGC) pulses, in a copy protected video signal and then dynamically applies lower levels for these pulses during scenes with APL lower than normal APL.

In this implementation, a low level of a retrace enhancer is varied depending on the average picture level (APL). The low level of the retrace enhancer can be lowered for scenes having lower than normal APL, wherein normal APL is defined for example as 50% of white level. Conversely, if a scene has a higher than normal APL, the blanking level of the retrace enhancer can be moved higher. In one example, the APL is about 25% or less, and the low level of a retrace enhancer is modified to below blanking level of the scene content (e.g. to minus 10% white or in NTSC, −10 IRE). In this example, a retrace enhancer hidden in the over-scan area in certain lines may be level shifted such that at least a portion of the active video signal is below blanking level. In another example, the APL of the scene is about 80% or higher, and the low level of the retrace enhancer is modified to be at about blanking level, or slightly higher than blanking level.

Depending on the implementation, such a method and apparatus can prevent certain lines in the over-scan area from going below blanking level of the scene content, thereby to avoid playability problems that could otherwise arise when an unattenuated video signal is displayed. Therefore, the adaptive approach avoids playability problems while maximizing copy protection effectiveness. For instance, if the low level of the retrace enhancer were to go below blanking level during the display of a scene with a high APL, then there would be a playability problem imposed by the TV set. One reason for the problem is that the sync slicer of the TV set slices at a less negative level during high APL scenes. The TV set treats the retrace enhancer as a sync signal, thereby causing a retrace at a different time from the actual sync signal. Such playability problems are minimized as described herein, e.g. by relating a to-be-changed attribute, such as the low level, of a copy protection signal such as provided by a retrace enhancer of a basic copy protection process, to a property of the scene content, such as the APL.

At the same time, copy protection effectiveness is maximized because the modified (e.g. level shifted) retrace enhancer becomes especially effective in an attenuated (for example, copied) video signal, which can include attenuated sync pulses, an attenuated picture level or a combination thereof. Specifically, utilizing the attenuated video signal caused by the AGC and pseudo sync pulses and/or horizontal sync pulses, allows for the modified retrace enhancers of the type described herein to be more easily sensed by VCRs and/or TV sets than the unmodified retrace enhancers. When the modified retrace enhancers are sensed, the VCR and/or TV set produces a more un-viewable picture than the copy protected video signal as described by Ryan '603 or the enhanced copy protected video signal as described by Wonfor '936. Note that although reference is made to the Ryan '603 and '098, Morio '253 and Wonfor '936 patents, a copy protection signal as described herein can be prepared according to any other prior art scheme, for example, schemes that cause gain control or darkening effects on a VCR and/or TV set.

Therefore, the method and apparatus of the present invention provide additional copy protection effects on a VCR and/or TV set using an attenuated video signal, while reducing playability problems during normal playback. A higher level of copy protection (e.g. darkening caused by an attenuation-based anti-copy process, plus an increase in picture instability over the processes in Wonfor '936) is achieved in accordance with the invention by dynamically changing the low level of the retrace enhancer to below blanking level, without causing artifacts for normal playback since such change is done only in dark scenes.

Figure 3A:
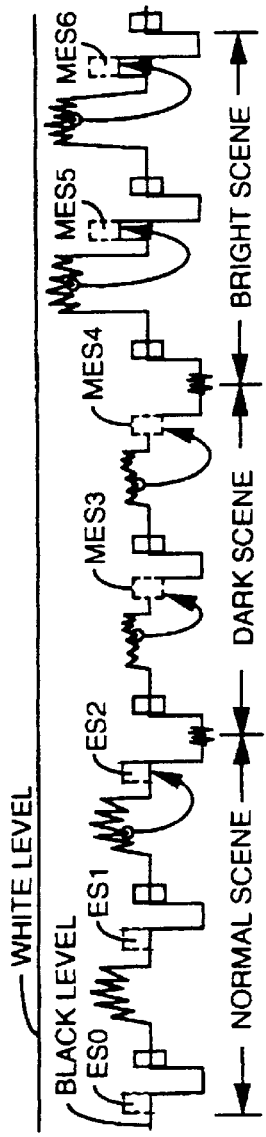
FIGS. 3A–3C illustrate retrace enhancers (also called content-sensitive retrace enhancers) MES3–MES6 and MGP1, MGP2, MGP4 and MGP5 in which the low level is changed dynamically, e.g., depending on scene content in one implementation of the circuit of FIG. 2A.
Figure 3B:
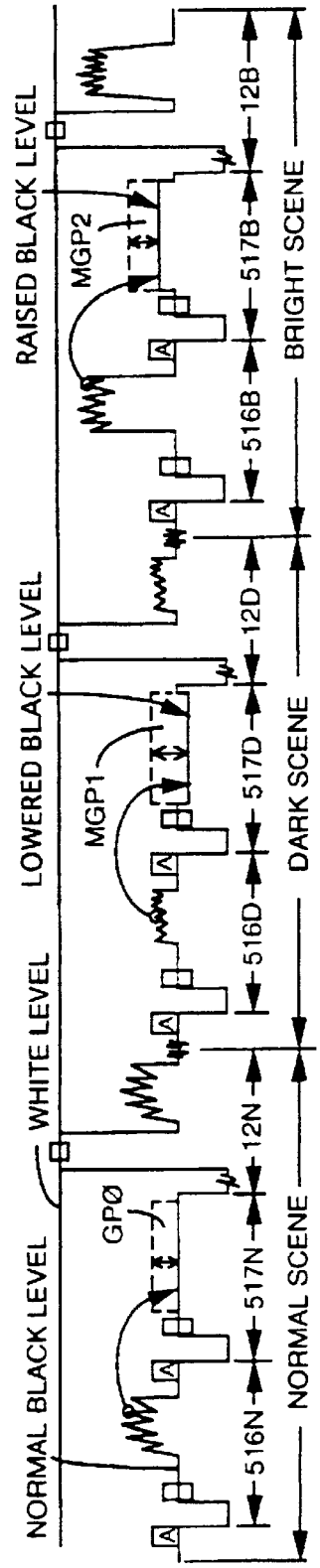
Figure 3C:
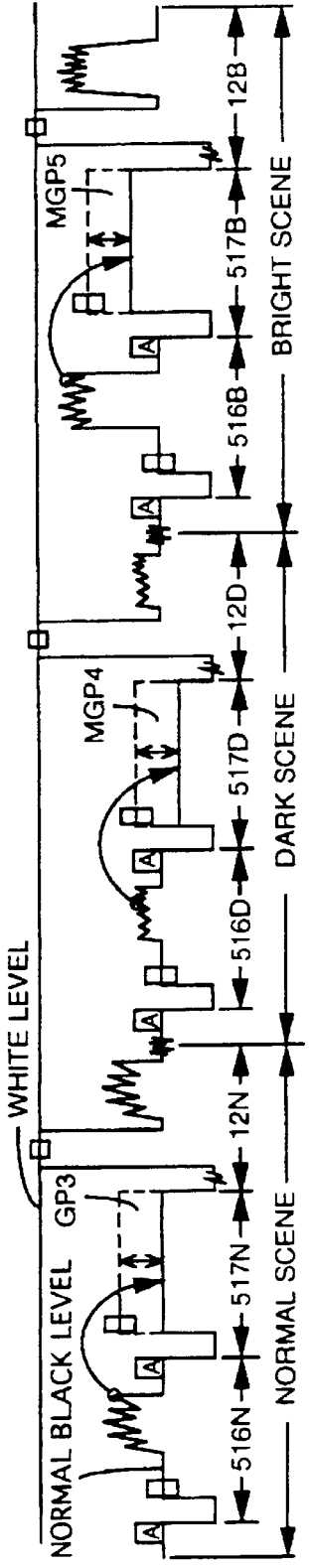

FIGS. 3A–3C illustrate the retrace enhancers of FIGS. 1A–1C that have been modified by changing their low levels across multiple frames. Specifically, in FIG. 3A, the low levels of the modified checkers MES3 and MES4 are below the normal black (or blanking) level, while the low levels of modified checkers MES5 and MES6 are above the normal black (or blanking) level. As in FIGS. 1A–1C, the features in the waveforms of FIGS. 3A–3C designated as ES0–ES2, MES3–MES6, GP0, GP3, MGP1–MGP2, MGP4–MGP5 are illustrated in dashed lines to indicate a variable video level.

Note that in one embodiment, movement of the just-described low levels is related to scene content. This specific embodiment is illustrated in FIG. 3A wherein modified checkers MES3 and MES4 are present at the end of lines of a dark scene (e.g. defined to be any scene with APL less than 40%), and therefore have their respective low levels moved to below blanking (or black) level. In contrast, modified checkers MES5 and MES6 occur in the lines of a bright scene (e.g. defined to be any scene with APL greater than 60%), and therefore have their respective low levels elevated to above blanking (or black level). Depending on the embodiment, the low level of the checker signal can be at or higher than the blanking level in a bright scene. For example, the low level can be a video level of from about zero to 7.5% of the white level.

Note that checkers ES1 and ES2 have remained unchanged, i.e. their low levels are at blanking (or black) level, because the video signal containing these lines includes a normal scene (e.g. any scene with APL between 40% and 60%).

Referring to FIG. 3B, the low level of gray pattern GP1 shown in FIG. 1B which occurs in a dark scene, has been moved to below the normal blanking or black level (modified gray pattern MGP1), while the low level of gray pattern of FIG. 1B which occurs in a bright scene has been moved to above the normal blanking or black level (MGP2). In a variant of the above-described embodiment, illustrated in FIG. 3C, the gray patterns carry the color burst, so that the color burst is also depressed or elevated as appropriate, depending on the APL of the scene content.

Figure 4A:
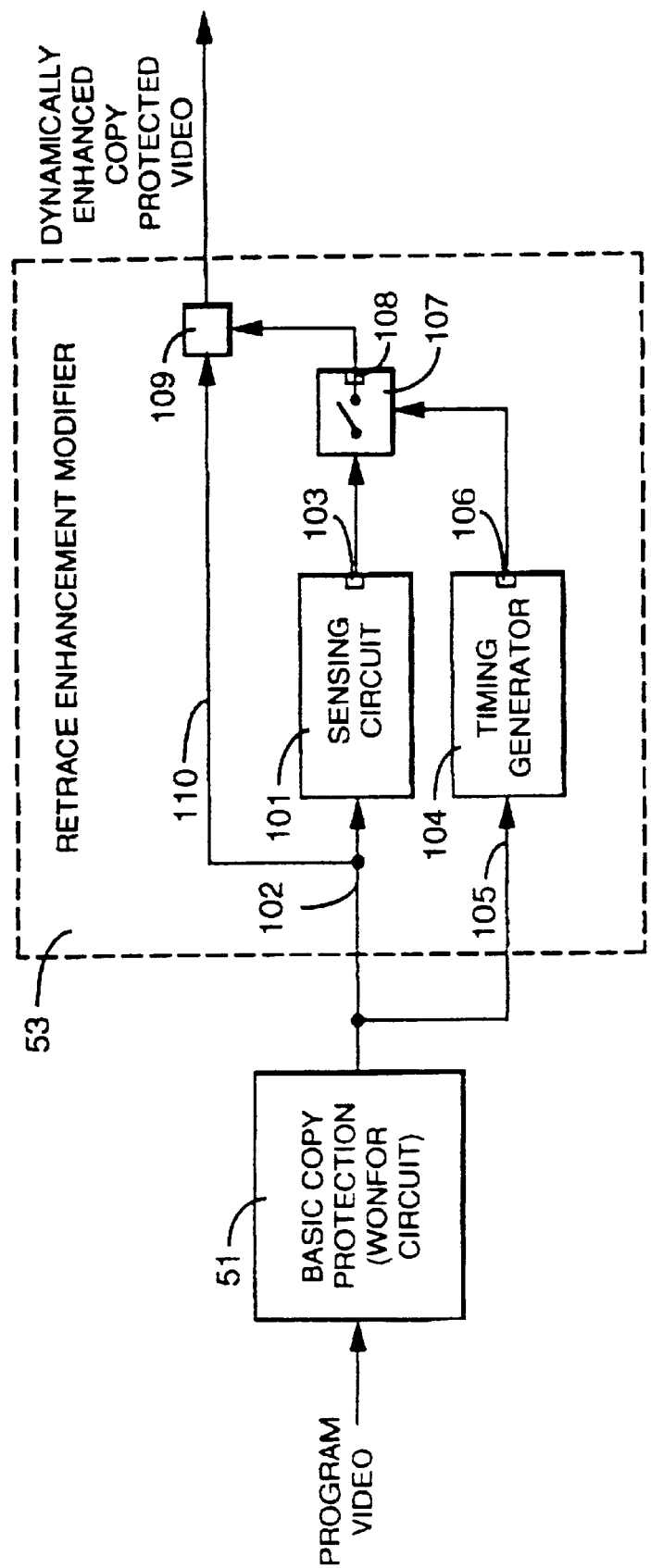
FIG. 4A illustrates, in an intermediate level block diagram, use of a brightness measurement circuit in conjunction with a retrace enhancement locator for dynamically modifying a retrace enhancer based on a signal related to brightness, e.g. in the manner illustrated in FIGS. 3A–3C.
Figure 4B:
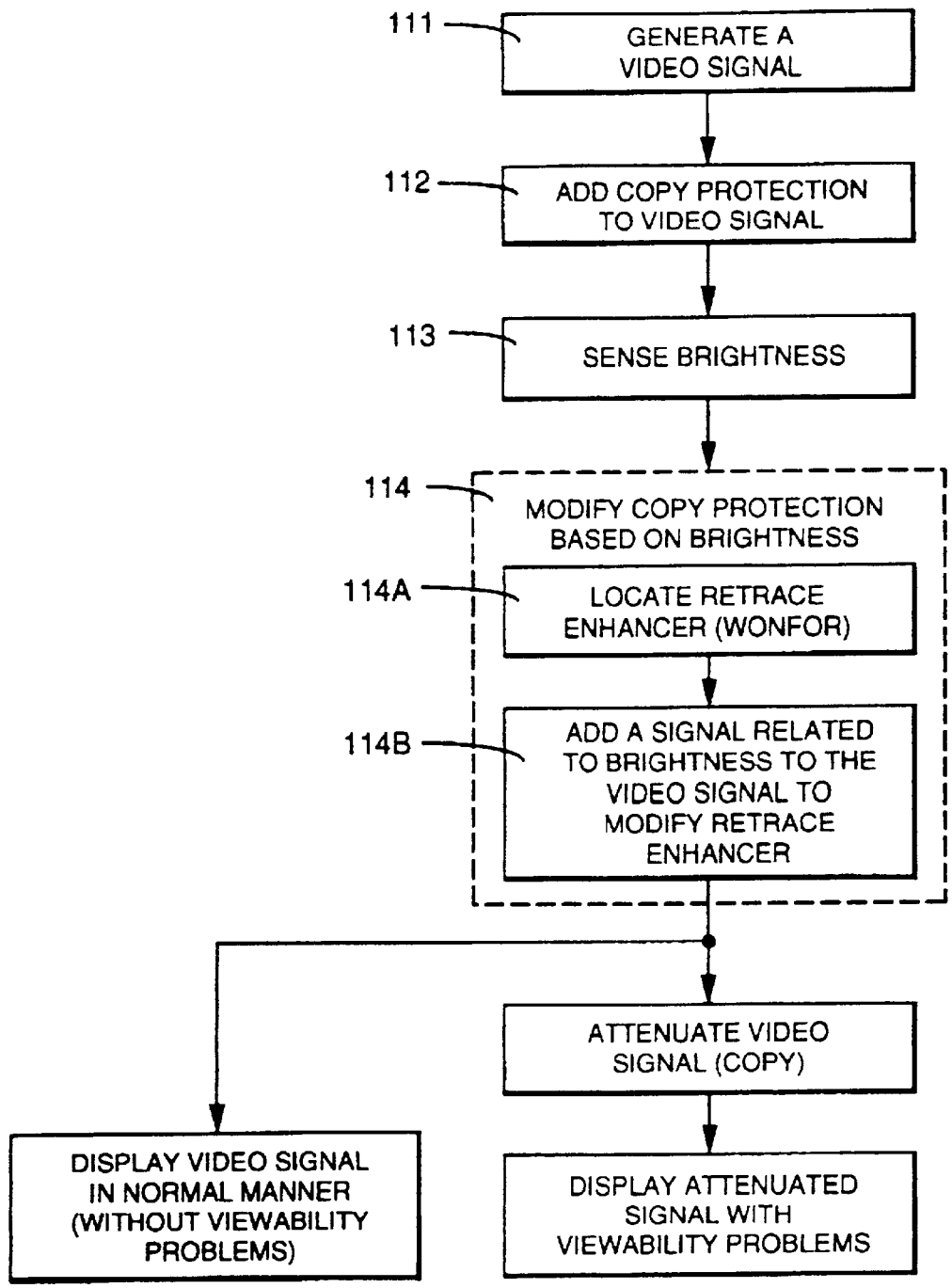
FIG. 4B illustrates, in a flow chart, acts performed to dynamically modify a retrace enhancer in the circuit illustrated in FIG. 4A.

One variant of the above-described embodiment is illustrated in FIG. 4A and includes the Wonfor '936 circuit 51 and a copy protection modifier (hereinafter "retrace enhancement modifier") circuit 53. Circuit 53 in turn includes a sensing circuit 101, such as a brightness measurement circuit, that receives a copy protected video signal on a video input line 102, and supplies, to a switch 107 via an indicator output terminal 103, a voltage level that is related to a property of scene content in the copy protected video signal. Therefore, in this embodiment, the sensing circuit 101 senses the brightness of a line, a frame or multiple frames of the copy protected video signal, as illustrated by act 113 in FIG. 4B. Note that the video signal received by circuit 101 already includes one or more retrace enhancers of the type described in Wonfor '936 that were generated by circuit 51 in a previous act 111 FIG. 4B and added to the video signal in a previous act 112.

It is understood that the sensing circuit 101 as described herein is not limited to a brightness measurement circuit, that is, the rate of brightness changes, but can be any other circuit that senses a property of the video signal. In addition to circuit 101, modifier 53 (FIG. 4A) includes a timing generator 104 (also called "retrace enhancement locator") that detects the location of a retrace enhancer in the video signal (as illustrated by act 114A in FIG. 4B). Timing generator 104 (FIG. 4A) has an input line 105 coupled to the input line 102 to receive therefrom the copy protected video signal, and a timing output terminal 106 for supplying a control pulse to the switch 107 when the retrace enhancer is present. Depending on the implementation, the sensing circuit 101 can be left "on", and switch 107 is controlled via the timing generator 104 to add (or otherwise insert) scene content-sensitive retrace enhancers of the type described herein.

The switch 107 includes an output terminal 108 coupled to a summing point 109. Summing point 109 is in turn connected by a line 110 to input line 102 that carries the copy protected video input signal. Therefore, summing point 109 combines the brightness signal and the video signal (as illustrated by act 114B in FIG. 4B), thereby to modify the retrace enhancer already present in the video signal. That is, to level shift the retrace enhancer by an amount indicated by the brightness signal. Depending on the implementation, summing point 109 can be implemented as any combiner, such as an adder (e.g. if a signal of voltage (−V) is supplied by circuit 101) or alternatively as a multiplier (e.g. if a signal of voltage (1−V) is supplied by circuit 101), or a combination thereof. Acts 114A and 114B together implement an operation 114 to modify copy protection based on brightness, or scene content.

Figure 5A:
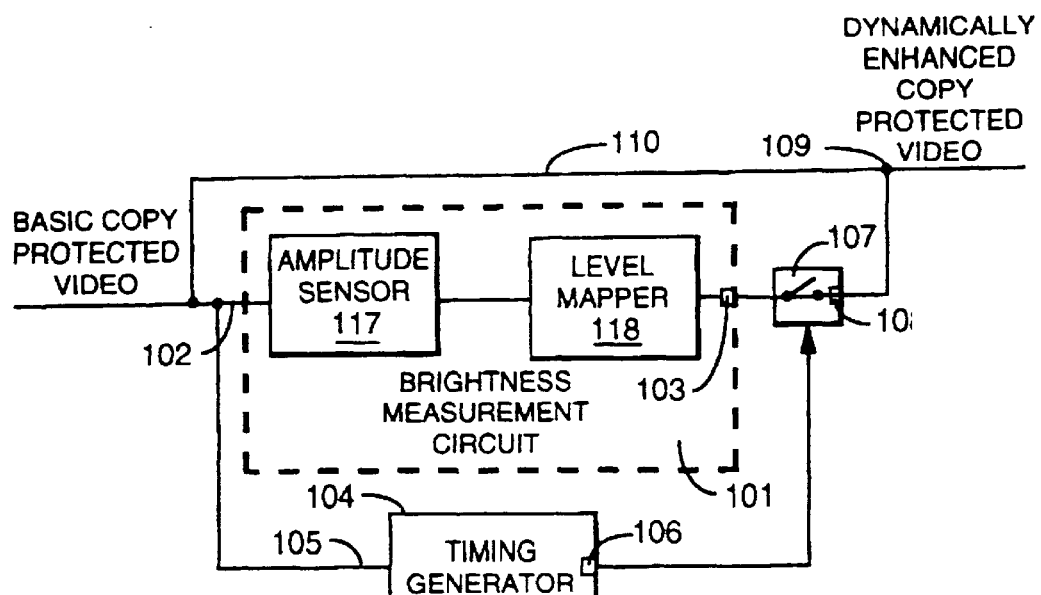
FIG. 5A illustrates, in an intermediate level block diagram, use of an amplitude sensor to detect an amplitude of the video signal received by the brightness measurement circuit illustrated in FIG. 4A.
Figure 5B:
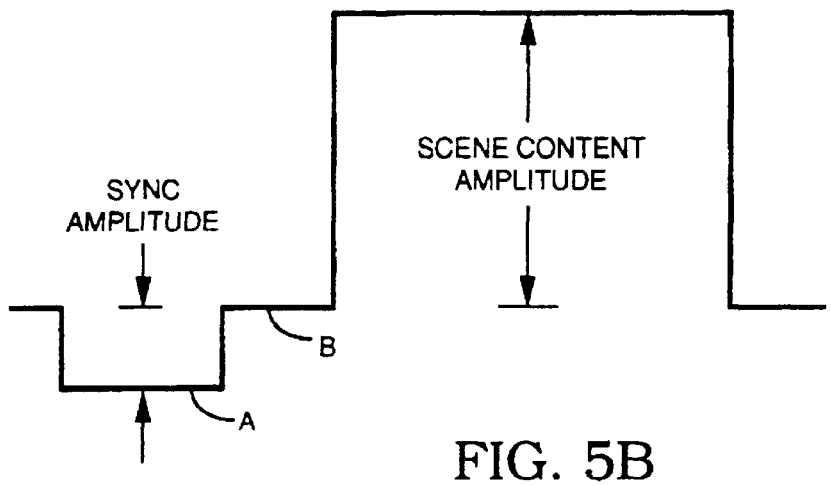
FIGS. 5B, 5C are waveforms illustrating portions of lines in a video signal having a bright scene and a dark scene respectively.
Figure 5C:
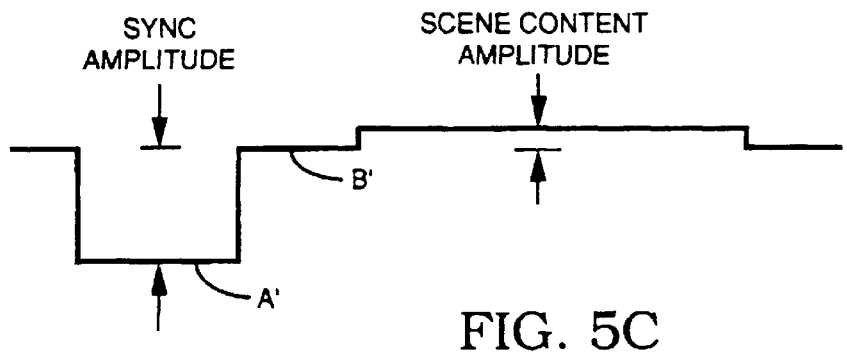

Referring now to FIG. 5A, illustrating in greater detail an embodiment of the copy protection modifier circuit 53, the sensing circuit 101 of FIG. 4A can include an amplitude sensor 117 for detecting an amplitude of the video signal received on input line 102, and a level mapper circuit 118 that uses the amplitude from sensor 117 to generate a voltage level at the output terminal 103. In one variant, amplitude sensor 117 directly measures the amplitude of scene content (see FIGS. 5B and 5C) in a line of the video signal, and may average the amplitude over several lines of a frame, or over multiple frames. In an alternative variant, sensor 117 measures the amplitude of the sync pulse at an input terminal of a transistor of a sync separator that is normally used in a TV set. In the alternative variant, the sync pulse amplitude changes in proportion to the average picture level (APL) of the scene content in the video signal. As illustrated in FIG. 5B, the sync pulse amplitude's absolute value BA can be, for example, 200 millivolts for a bright scene, and changes to an absolute value B'A' of, for example, 300 millivolts for a dark scene. The loss in sync pulse amplitude between scenes of different brightness (e.g. from 300 millivolts to 200 millivolts) is caused for example by clipping action in a sync separator's input circuit (such as at the base of transistor Q1 in circuit 223 illustrated in FIG. 8A).

Figure 5D:
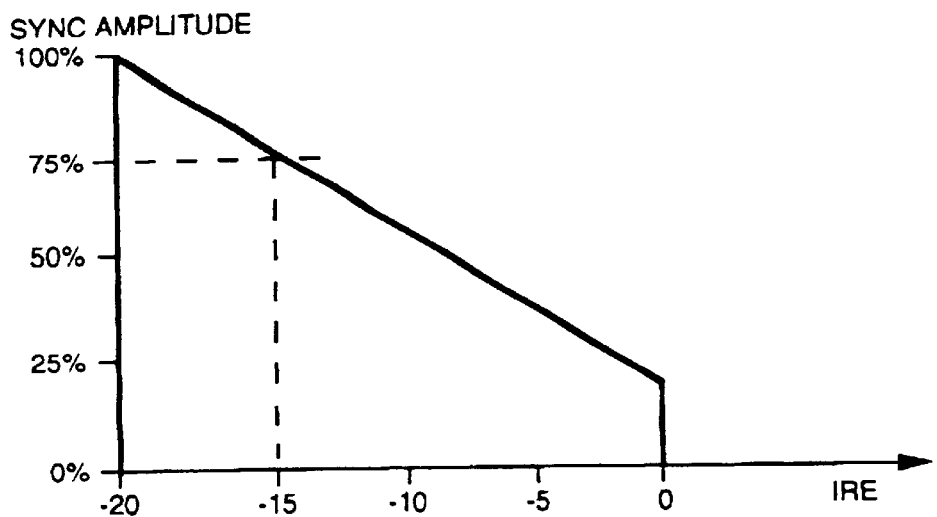
FIG. 5D illustrates in a graph a relation between sync amplitude (plotted along the y axis) measured by the amplitude sensor of FIG. 5A and a relative low state level (plotted in IRE units along the x axis) provided by the level mapper of FIG. 5A for use as the low level of a retrace enhancer (such as a checker or vertical jitter pulse).

As described above, a level mapper circuit 118 (FIG. 5A) maps the amplitude generated by sensor 117 into a voltage level for use in modifying a retrace enhancer. Mapper circuit 118 can be programmed to generate any specific function, such as a linear relation as illustrated in FIG. 5D, or alternatively can be a nonlinear relation. In the example illustrated in FIG. 5D, when the measured sync amplitude provided by sensor 117 (FIG. 5A) is 25% (or less) of the maximum value, mapper circuit 118 generates a voltage level corresponding to 0 IRE (e.g. the voltage may be 0). When the sync amplitude is 80% of the maximum value, mapper circuit 118 generates a voltage level corresponding to −15 IRE. Therefore FIG. 5D shows an example of how the low states of checker signals are further lowered as a function of sync amplitude measured at the input of a sync separator. Note that the low state voltages plotted on the "X" axis can be used as level shifting voltages for selected lines or line portions of the program video, thereby to create another method of enhancing the copy protection process.

Also as noted above, switch 107 (FIG. 5A) supplies the voltage level generated by mapper circuit 118 to summing point 109 at the appropriate time, to level shift or attenuate one or more retrace enhancers already included in the video signal on line 110. Therefore, depending on the scene content, the low levels of retrace enhancers are level shifted by different amounts depending upon the APL of the scene as illustrated in FIGS. 6A and 6B. Specifically, in a bright scene checkers C1 and C2 in FIG. 6A are moved by the voltage level ΔV (a positive value that moves the low checker C2 above blanking) while checkers C3 and C4 in FIG. 6B are moved by the voltage level ΔV' (a negative value that moves the low checker C4 below blanking).

Note that under attenuated circumstances, the TV or VCR sync separator also has a corresponding change in the sense signal, that is, the slice level, (shown dashed in FIGS. 6A and 6B) due to the fact that the slice level raises or lowers in proportion to the scene brightness or darkness, respectively. As a result, the sync signal for the low checker condition starts earlier than the sync signal for the high checker condition for both scenes, as illustrated in FIGS. 6A and 6B. Specifically, the earlier start of the sync signal (see signals 6AA and 6BB in FIGS. 6A and 6B) due to a low checker causes retrace to start at the leading edge of checkers C2, C4, which is earlier than the retrace triggered by the normal sync signal (see signals 6AAA and 6BBB in FIGS. 6A and 6B) due to a high checker, where the retrace starts normally at the leading edge of sync.

Sync pulse narrowing can be as advantageous as lowering the blanking level of retrace enhancers such as the checkers and/or vertical jitter pulses of previous mention. Dynamic narrowing of a sync pulse width can be used as an alternative to or in addition to the dynamic lowering of the blanking levels of the retrace enhancers described above. Specifically, the narrower the sync pulse, the more sync amplitude clipping is associated with a sync separator. A reason for dynamically lowering the blanking levels of retrace enhancers is so that the TV set's sync separator will trigger off the lowered blanking level checkers and/or vertical jitter signals when an illegal copy is played back. Similarly, dynamically reducing the sync pulse's width, for example, as a function of the brightness or average picture level, can increase the effectiveness of copy protection of an attenuated version of the video signal, while maintaining a safer play-ability for an unattenuated version of the video signal.

An example of the dynamic sync pulse narrowing process of the invention may comprise narrowing the horizontal sync pulses near the VBI relatively less (e.g. to 4.0 microseconds) for greater or average scene content levels, while narrowing the sync pulses relatively more (e.g. to 2 microseconds) for lower scene content levels. Dynamic sync narrowing as described herein is preferably but not necessarily used with a copy protection circuit such as described in Ryan '603, or with any parts of circuitry described herein, or with a basic copy protection process that for instance causes attenuation or darkening of the picture in a VCR or TV set.

Figure 5E:
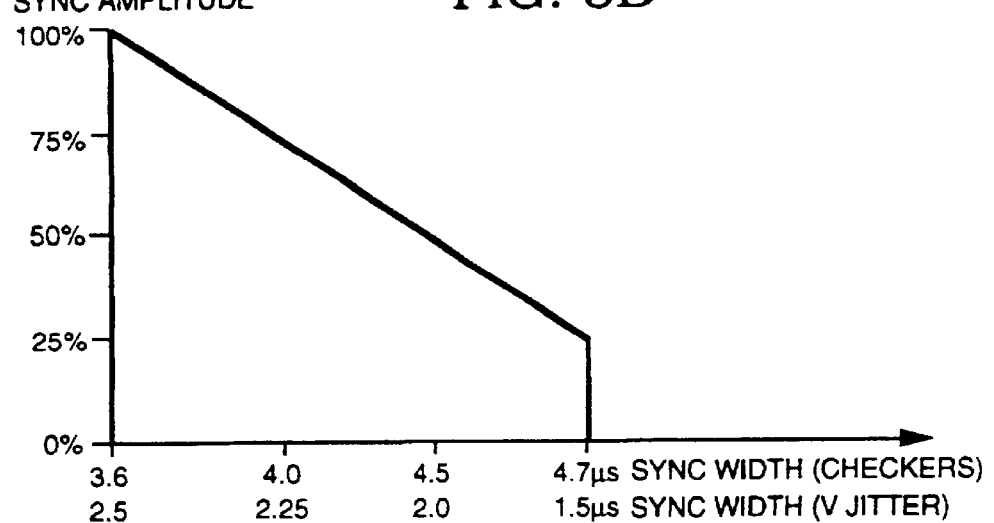
FIG. 5E illustrates, in a graph, amplitude of the sync pulse (along the y axis) at the input line of the sync separator (or alternatively the brightness of the scene) as a function of reduction in width of the sync pulse (along the x axis).

FIG. 5E illustrates the use of sync pulse narrowing on the H sync pulses during most of the active field for checkers, preferably on the trailing edge of sync, and the H sync pulses near the VBI for vertical jitter signals. The sync amplitude (plotted along the y axis in FIG. 5D) is measured at the input of a typical sync separator, and the H sync widths (plotted along the x axis) are the replaced narrowed syncs. In the sync narrowing process, the leading edge of the narrowed sync pulse is preferably, but not necessarily, substantially coincident with leading edge of the normal sync signal.

Figure 7A:
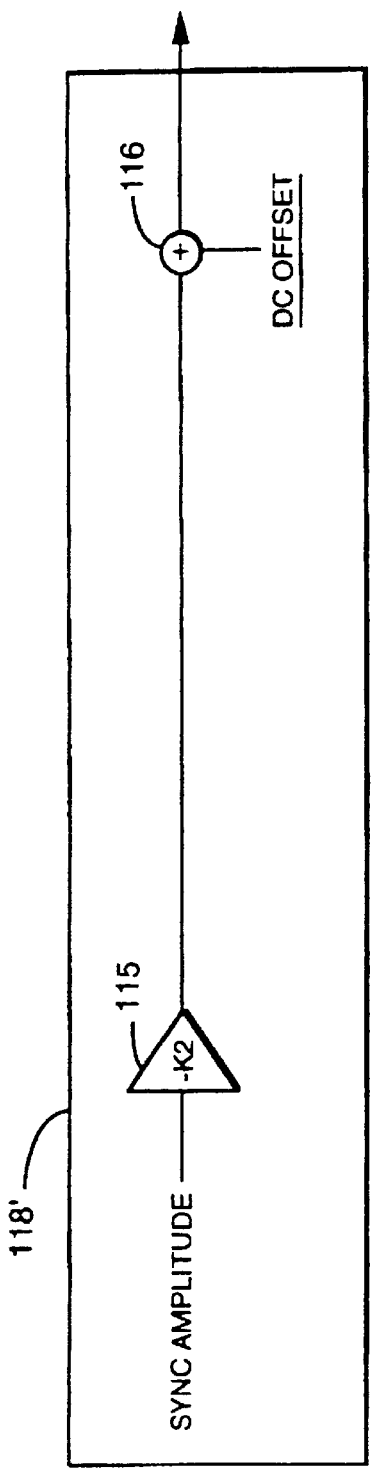
FIGS. 7A and 7B illustrate, in a low level block diagram, alternative implementations of a level mapper illustrated in FIG. 5A.

Depending on the implementation, a mapper circuit 118' illustrated in FIG. 7A, can include an inverting amplifier 115 and a summing junction 116, which also is coupled to a DC OFFSET signal. The DC OFFSET signal may include an AC component. Alternatively a mapper circuit 118" may include the components depicted in FIG. 7B of an analog to digital converter 119, a memory 120, a digital to analog converter 121, an inverting amplifier 122 and the summing junction 116. Use of a memory (such as an EPROM) allows a relation other than the linear relation illustrated in FIG. 5D to be implemented, although this implementation is more expensive. Regardless of the implementation, mapper circuit 118" is configured to supply a voltage level based on the sync separator effects on sync amplitude. For example, FIG. 5D illustrates a range of 0 to −20 IRE, wherein 100 IRE corresponds to 714 millivolts for a 1 volt peak to peak video signal. Note that in some cases the DC OFFSET signal has the value 0 volt.

Figure 7B:
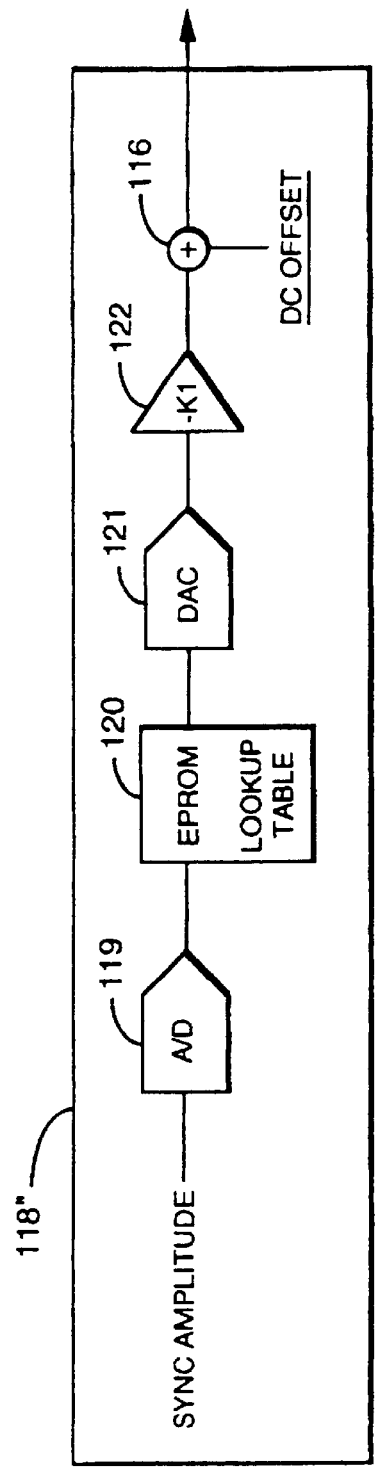
Figure 7C:
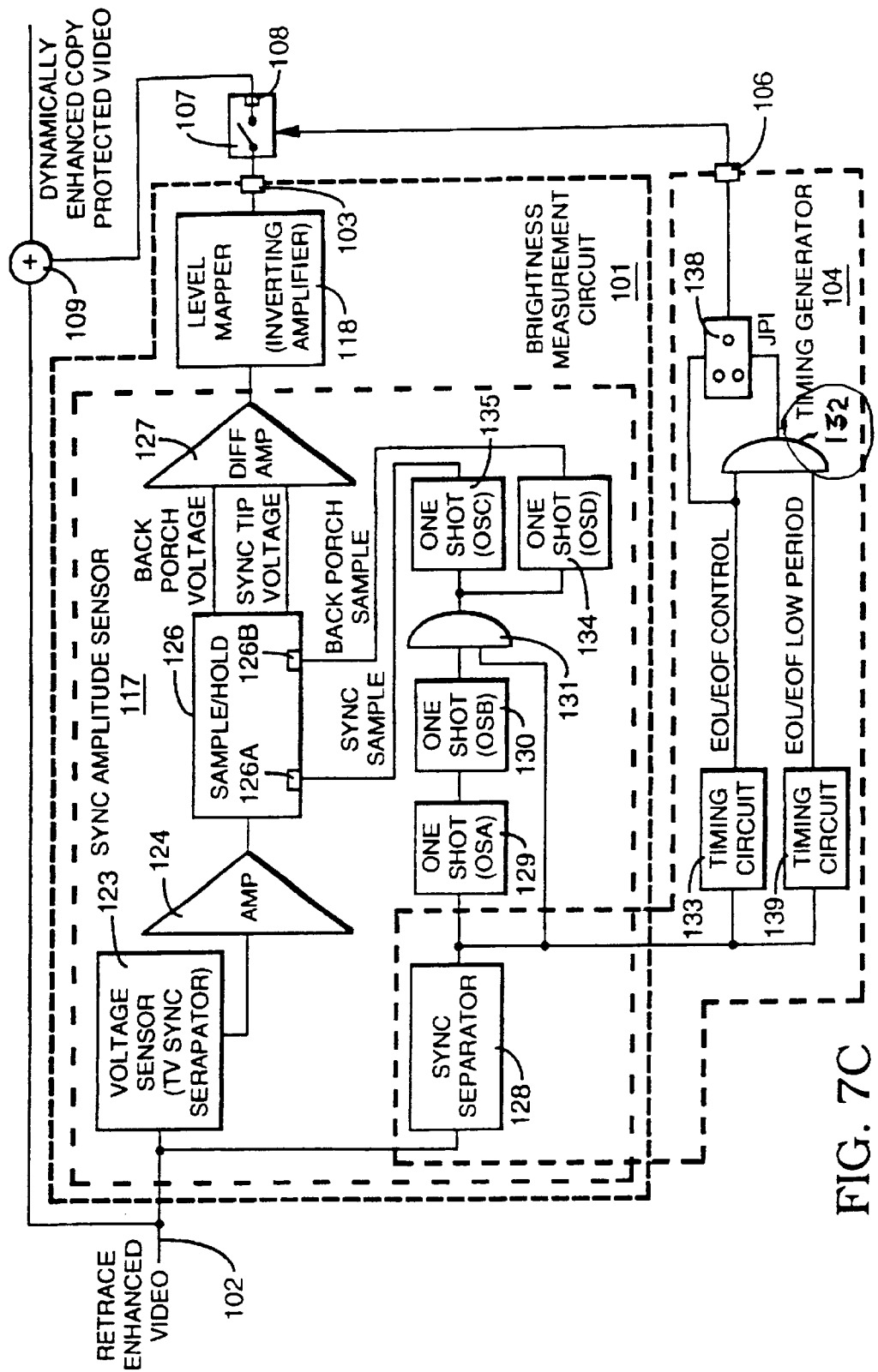
FIG. 7C illustrates, in a low level block diagram, one variant of a sync amplitude sensor and a retrace enhancement detector of the type illustrated in FIG. 5A.

FIG. 7C illustrates in yet greater detail an embodiment of the copy protection modifier circuit 53. To this end, the amplitude sensor 117 similar to that of FIG. 5A measures the sync amplitude (for example, BA of FIG. 6A) as described above, and can be implemented by use of a circuit 123 which is preferably, but not necessarily a typical TV set sync separator. At the input transistor (see Q1 of FIG. 8A) or equivalent of circuit 123, the amplitude of the sync pulse varies in relation to the video picture level. This sync pulse amplitude is measured by circuits 124, 126, and 127. Circuit 124 is a buffer amplifier which outputs to a sample and hold circuit 126. Sample and hold circuit 126 receives sync sample pulses and back porch sample pulses at respective control terminals 126A and 126B preferably every horizontal line, substantially free of any copy protection signals.

Sample and hold circuit 126 outputs the measured values A and B respectively of sync and backporch (i.e., blanking) levels to two input lines of a differential amplifier circuit 127. The output of circuit 127 is coupled to a level mapper circuit 118. As noted above in FIG. 7A, mapper circuit 118 can be implemented by just an inverting amplifier. Such an inverting amplifier supplies a negative voltage that is proportional to the sync amplitude to terminal 103. This negative voltage is then summed into the input video by way of switch 107 and summing point 109 during occurrence of the "checker" or "jitter" retrace enhancers. Therefore, the output of summing point 109 has dynamically shifting low (and/or high) retrace enhancers that reduce artifacts during a TV set playback of the unattenuated video signal, while increasing the effectiveness of copy protection when the video signal is attenuated as when copied.

Sensor 117 (FIG. 7C) derives the sync sample and back porch sample signals by coupling the input video into a sync separator circuit 128. The output of sync separator circuit 128 then comprises composite syncs which may also include pseudo sync pulses. A one shot timing circuit 129 receives the output from circuit 128 and generates horizontal rate pulses free of vertical syncs or pseudo syncs. The output of circuit 129 is coupled to one shot circuit 130 whose output is logically ANDed with the output of circuit 128 via AND gate circuit 131. The output of AND gate circuit 131 is fed to timing circuit 135 (another one shot) to provide the sync sample signal. The output of circuit 131 also is fed to circuit 134 (yet another one shot) which generates the back porch sample signal in the back porch region coincident with blanking level. The sync sample and back porch sample pulses are supplied to respective control terminals 126A and 126B of circuit 126 (as discussed above). Note circuit 134 avoids generating a pulse coincident with raised (or otherwise modified) back porch levels, such as another basic copy protection process as illustrated in Ryan '098 or Morio '253.

In the embodiment illustrated in FIG. 7C, the timing generator 104 shares sync separator circuit 128 that is included in the sync amplitude sensor 117. In addition to circuit 128, the timing generator 104 includes a timing circuit 133 which receives a signal from circuit 128, and outputs a signal "EOL/EOF CONTROL" which includes pulses coincident with e.g. retrace enhancers ES0–ES6 and GP0–GP5 illustrated in FIGS. 1A–1C. The output signal of circuit 133 can be fed directly to switch 107 via a jumper 138 and terminal 106, thereby to add the voltage level from the mapper circuit 118 to the retrace enhancers in the video signal as described above.

Alternatively, jumper 138 can be set to supply a signal from an AND gate 132 to the switch 107. AND gate circuit 132 receives the signal from circuit 133, and another signal "EOL/EOF LOW PERIOD" from another timing circuit 139. Signal "EOL/EOF LOW PERIOD" is logic high only during the low states of the retrace (e.g. checker or vertical jitter) enhancement signals. The signal "EOL/EOF CONTROL" also is obtained as a logical ORing of signals "EOL/EOF LOW PERIOD" AND "EOL/EOF HIGH PERIOD". In the just-described alternative jumper configuration, the output of mapper circuit 118 is supplied to summing point 109 by switch 107 generally only during the low states of the retrace enhancers. The high states of the retrace enhancers generally remain unaffected).

Figure 8A:
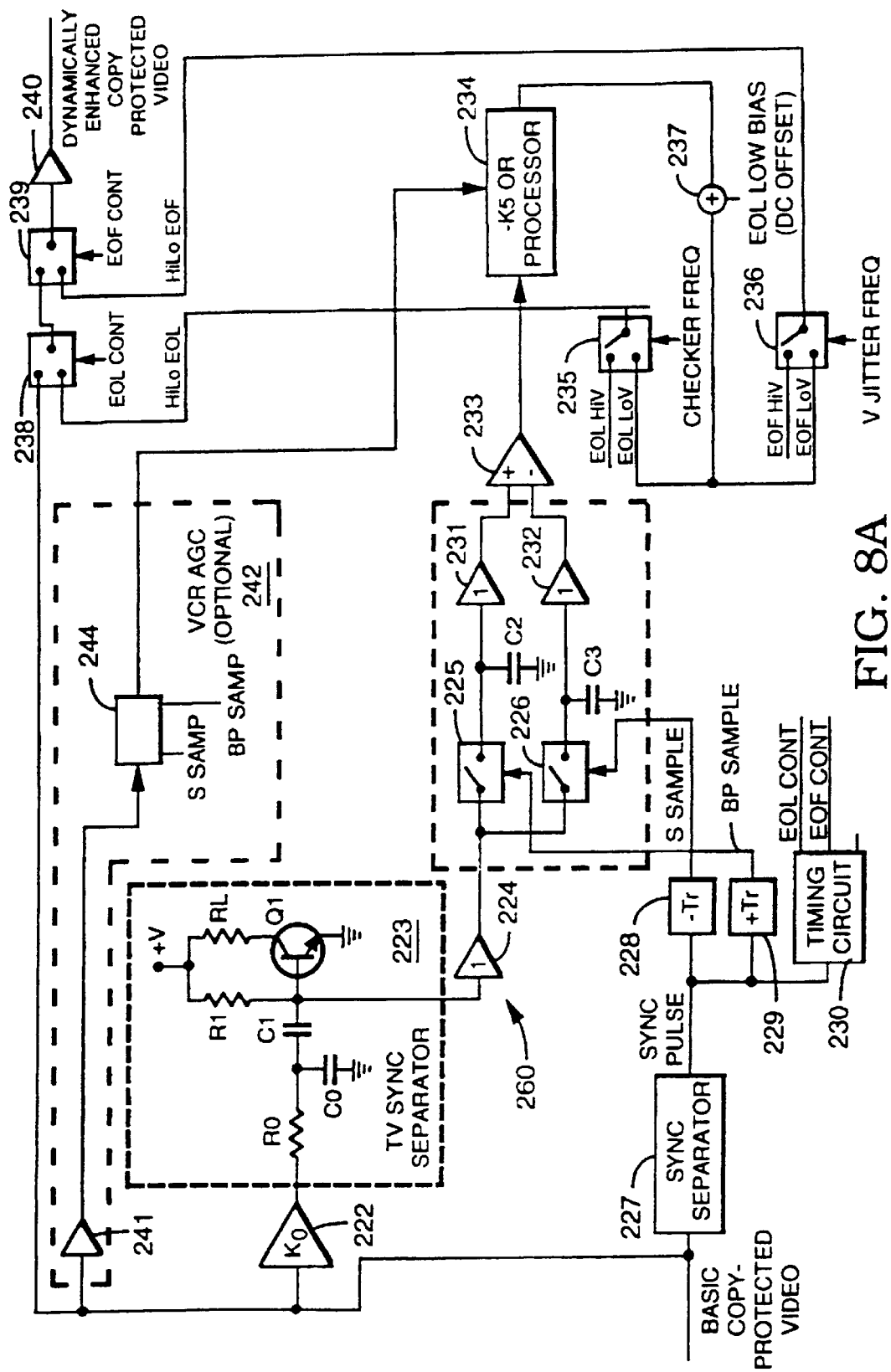
FIG. 8A illustrates, in a circuit diagram, an implementation of the circuitry illustrated in FIG. 7A wherein retrace enhancers also are modified dynamically.

In a further implementation illustrated in FIGS. 8A and 8B, a copy protected video signal that preferably causes gain variations in the VCR (also called "basic copy protection") is received as an input signal, and the output signal has basic copy protection along with horizontal or vertical or both types of retrace enhancers that have an attribute related to the scene content (e.g. average picture level). The input video signal is received by an amplifier circuit 222 which inverts the received signal, and feeds an inverted video waveform to a typical sync separator circuit 223. Sync separator circuit 223 includes an input resistor R0 that has its output coupled by capacitor C0 to ground. The output of resistor R0 is also coupled by capacitor C1 to the base of a transistor Q1. The base of transistor Q1 is also coupled by a resistor R1 to a source of high reference voltage +V. The collector of transistor Q1 is also coupled by resistor RL to the source of high reference voltage +V, while the emitter is coupled to ground.

The video signal at the base of transistor Q1 includes a sync pulse whose amplitude varies in relation to the picture level being carried by the input video signal. Resistors R0 and R1 are set preferably to make circuit 223 mimic a representative TV's sync separator. For example, sync tips will be more attenuated and/or clipped with larger R0 values (e.g. 1K ohms is larger with respect to 500 ohms) or with lower R1 values (e.g. 68K ohms is lower with respect to 200K ohms). Once the values of all components in sync separator circuit 223 are set, then the amount of sync attenuation and/or clipping is substantially related to video picture level, that is, scene content. In general, the higher the scene content or average picture level, the higher the amount of sync attenuation (or clipping) measured at the base of transistor Q1.

An amplifier circuit 224 buffers the voltage on the base of transistor Q1 whereby the sync amplitude at the transistor's base is measured via sample and hold circuits which in turn produce blanking level and sync tip signals. A sample and hold circuit for measuring the blanking level is formed by switch 225, a capacitor C2, and an amplifier 231. Another sample and hold circuit for measuring the sync tip level is formed by a switch 226, a capacitor C3, and an amplifier 232. The outputs of amplifiers 231 and 232 are coupled to a differential amplifier 233 and thence to a mapper circuit 234.

As noted above, mapper circuit 234 can be implemented by a simple inverting amplifier which adds a negative voltage to the low state in proportion to the sync amplitude from Q1's base. Thus in this case the higher the sync amplitude at Q1's base the more negative the voltage for the low state of the horizontal and/or vertical enhancement signal. Note that the unless otherwise specified, in the circuitry illustrated in FIGS. 8A and 8B, the video blanking level is defined as zero volt.

In another form, the mapper circuit 234 may include the analog to digital converter, the memory circuit, an optional microprocessor, and the digital to analog converter depicted for example in FIG. 7B. In this case, the sync amplitude voltage at Q1's base is mapped to a voltage determined by the memory circuit and/or microprocessor circuit. With this form, a more precise way of optimizing the lowered or negative low state voltage of the horizontal and/or vertical retrace enhancer as depicted for example in FIGS. 1A–1C, can be achieved.

The output of mapper circuit 234 is coupled to an input of a summing circuit 237. The other input of summing circuit 237 is coupled to the source of an initial low state voltage (see signal EOL LOW BIAS in FIG. 8A, also called DC OFFSET in FIG. 7A, nominally 0 volt). Signal EOL LOW BIAS provides a voltage above the blanking voltage in the case of high APL. Note that if the brightness of a scene is sufficiently high, for example, greater than 60%, the low level of checkers can go to above blanking and the DC OFFSET signal is increased to above blanking level (e.g. about +5% white).

The output of summing circuit 237 is coupled to a switch 235 which generates a horizontal enhancer (i.e., the EOL signals or checkers) by switching between a high state voltage EOL Hi V, and the low state voltage signal EOL Lo V received from circuit 237. The frequency of switching of switch 235 is determined by the frequency of a signal "checker freq" from a generator source (not shown). The checker frequency signal can be DC high or low (i.e., zero frequency), for example implemented by replacing the front porches of all lines. Alternatively, the addition of checkers may be switched on and off for example at the rate of DC to 1,000 Hz (in one example 300 Hz is used) or N times the field frequency where N is a whole number such as 10 or 11. The output from switch 235 is supplied to a switch 238, for insertion into the video signal. Specifically, another signal EOLCONT that is generated by a timing circuit 230 controls operation of switch 238 to insert the horizontal retrace enhancer into the video signal.

Similarly, the vertical retrace enhancer is generated by a switch 236, which switches between the low state voltage EOF Lo V of summing circuit 237 and a high state voltage EOF Hi V. The frequency of the vertical retrace enhancer is determined by a signal "vert jitter freq" at the control input of switch 236 that is received from another generator source (also not shown). The jitter frequency can also be DC high or low, or for example, at a rate of up to 20 Hz, and in one example the frequency changes between 2 and 10 Hz, and is swept every 3 seconds. Switch 236 supplies the output signal to one of the inputs of a switch 239, thereby to insert the vertical retrace enhancer into the video signal. Specifically, switch 239 is controlled by a signal EOFCONT from timing circuit 230. The output of switch 239 is coupled to an output amplifier circuit 240 which supplies a video signal having the modified retrace enhancers of the invention as described herein. It is understood that either or both (modified) horizontal and vertical retrace enhancers may be added to (FIG. 8C), instead of inserted, in the video signal.

An optional measurement circuit 242 in FIG. 8A formed of circuits 241 and 244 coupled in series between the input terminal and the mapper circuit 234, takes into account the effect of a video cassette recorder's (VCR's) AGC amplifier. Circuit 241 is preferably an AGC amplifier of a typical VCR. Because circuit 241 responds to an attenuation-based copy protection process, the video level will be modified at the output thereof, which is coupled to circuit 244. Circuit 244 is a sample and hold circuit that measures the sync amplitude. The output of circuit 244 is fed to the mapper circuit 234. In this example, mapper circuit 234 now has a measure of the amount of sync reduction caused by video level when fed to a TV set's sync separator, and another measure of the amount of video attenuation present in a recorded copy of the copy protected video signal. Circuit 234, in the situation of maximum copy protection with minimum playback artifacts, can for example, generate a more negative voltage via the sample and hold circuit 244 when the sync is at a minimum, due for example to the action of an integral AGC amplifier, and via the differential amplifier 233 when sync is at a maximum due to a lesser amount of clipping at the base of transistor Q1. Circuit 242 also can be used to gate the checker and/or the EOF during maximum AGC effect.

Note that the signals for sync sampling (e.g. signal ssamp) and blanking level (e.g. signal bpsamp) that are required by the above-described sampling and hold circuits 244 are generated by circuits 228 and 229 respectively. Circuit 228 and 229s include a one shot or other timing circuit and may include circuitry to avoid generating a timing signal which is coincident with raised or modified back porch signals or selected portions of back porch signals. Sync separator circuit 227 supplies its output signal to each of circuits 228, 229, and 230 and may include circuits which gate out copy protection (e.g. pseudo sync pulses), and instead output only the normal composite sync signals.

An alternative embodiment of the invention comprises an optional circuit 400 (FIG. 8B) which dynamically changes the sync pulse widths of the input signal as a function of the average picture level, or of sync level as modified at the input of sync separator 223 (FIG. 8A), to add further enhancements to a copy protected signal. Specifically, a signal from for example the amplifier 240 (FIG. 8A) is fed to an input of a switch 410 (FIG. 8B). The other input of switch 410 receives a signal having new sync pulse and color burst. This new sync pulse is narrowed dynamically as a function of average picture level (e.g. sync amplitude measured at the input of a sync separator) on selected lines in the video signal. The new burst is preferably but not necessarily the same color phase as the input video signal. It may also be preferable (but not necessary) to have the burst envelope longer than the original input video signal's color burst. As the sync pulse is narrowed, the burst typically is preferably but not necessarily lengthened, starting for example from the end of the HBI, as further described below.

A narrowed sync pulse is generated by a variable one shot timing circuit 405, which receives a trigger input signal from a circuit such as sync separator circuit 227 (FIG. 8A). Sync amplitude (i.e. as a function of picture level) from for example the differential amplifier 233 (FIG. 8A) is supplied to a processing circuit 403 (FIG. 8B) which may be, for example, an amplifier with a DC offset voltage. The output of circuit 403 is then supplied as a width control input signal to circuit 405. This width control input signal for example controls the current flowing into a timing capacitor included in circuit 405. The higher the current, the shorter the duration of a pulse supplied by circuit 405. If the sync amplitude as measured by differential amplifier 233 (FIG. 8A) is high, then the output pulse from circuit 405 is very narrow or narrower than normal, and if the sync amplitude is low, the output pulse from circuit 405 is wider (i.e. less narrowed). The output pulse from circuit 405 is supplied as an input to a summing circuit 409 (FIG. 8B) and a one shot timing circuit 406. One shot circuit 406 is triggered by e.g. the trailing edge of the output pulse from circuit 405. The output signal from circuit 406 is typically greater than 2.8 microseconds wide for example to accommodate a new burst envelope.

A phase locked loop circuit 401 (FIG. 8B) regenerates the color subcarrier which is supplied to an input line of an AND gate 407. The other input line of circuit 407 receives a burst gate output of one shot circuit 406. The output of circuit 407 is supplied to a chroma band pass filter circuit 408. The output of circuit 408 is substantially the correct color burst phase, and is supplied as an input to the summing circuit 409.

The output of circuit 409 has narrowed sync (that is, modified pulse width) and new color burst, and is passed as an input to switch 410, which is controlled by a signal output by an AND gate 404. AND gate 404 allows switch 410 to selectively supply the new narrowed sync pulse and new color burst during at least a portion of the horizontal blanking interval (HBI) of selected lines (e.g. lines in or near the vertical blanking interval (VBI)). Timing circuit 402 generates the signals for new sync pulse and burst interval plus the period(s) of selected TV line(s). Circuit 402 receives a sync pulse signal from circuit 227 (FIG. 8A) and uses the received signal to time off therefrom. The outputs of circuit 402 also provide a timing (e.g. color burst timing) pulse for burst PLL circuit 401 which can also be used for subcarrier regeneration as described above. The PLL circuit 401 also is coupled to the input video from FIG. 8A. The output of switch 410 is supplied as an input to an amplifier 411 which therefore provides a video signal having sync pulses whose widths change dynamically in relation to brightness of the scene carried by the video signal. These modified width sync pulses preferably have their leading edge substantially matched to the leading edge of normal sync pulses.

Figure 5F:
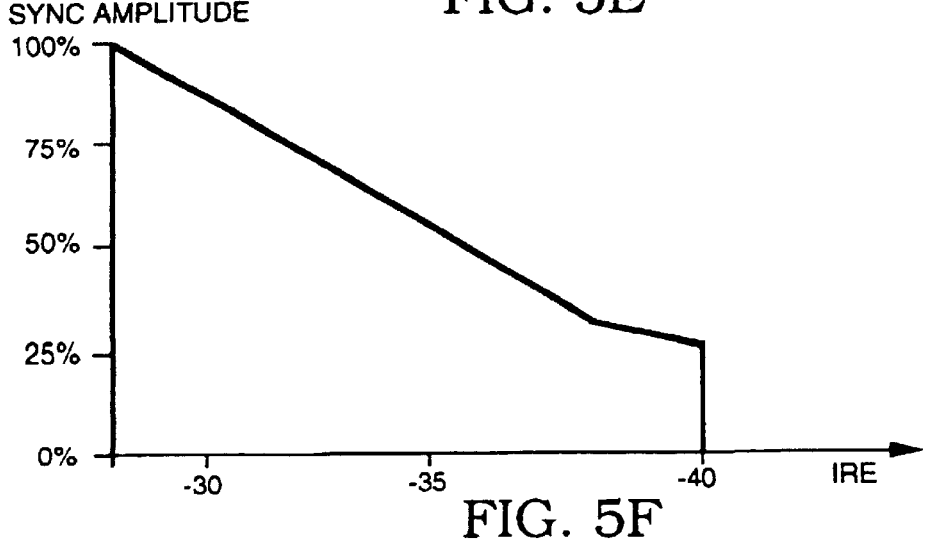
FIG. 5F illustrates, in a graph, amplitude of the sync pulse (along the y axis) as a function of dynamic sync attenuation relative to scene content (along the x axis).

In a further variant of the invention, sync clipping or attenuation can also be used instead of average picture level to dynamically enhance a copy protection signal. FIG. 5E illustrates how the sync pulse width is reduced (see x axis) as a function of the sync amplitude measured at the input of a sync separator for the input video (see y axis). FIG. 5F shows that during a scene with low average picture levels that produce high sync amplitudes, the output or selected sync is reduced, i.e., by 10 to 20 IRE. Likewise, if the average picture level is high, resulting in low sync amplitude (as measured at the point of the sync separator), the amount of sync pulse's width reduction for output is about zero; so the output sync pulse's width remains at about 40 IRE.

Therefore, the apparatus and method of the invention compensates for the variation in copy protection effect due to the scene content, such as the average picture level, commonly caused by prior art methods. For example, the higher the APL or average picture level, the greater the copy protection effect. Specifically, the various embodiments of the apparatus and method of the present invention overcome the variation problem of a high APL causing greater amounts of sync clipping in the sync separator of a TV set and/or or VCR which then causes increased sensing of the retrace enhancer for a greater copy protection effect, and lower APL causing less sync clipping in the sync separator, and thus less sensing of the retrace enhancers for an ordinary copy protection effect.

In such an embodiment, the circuit elements between and including amplifiers 222 and 233 of FIG. 8A together form a brightness measurement circuit 260 of the type described elsewhere herein. Instead of replacing a portion of a video signal with a retrace enhancer, which varies with brightness of scene content, as illustrated by switches 238 and 239 in FIG. 8A, the retrace enhancer can be formed by just modifying the video signal portion as illustrated by a summer 250 in FIG. 8C. Note that the remainder of the circuit of FIG. 8C is identical to that of FIG. 8A except for the just-described difference. Specifically, in FIG. 8C, the switch 238 receives only one signal (signal EOL) from switch 235, and the switch 239 also receives only one signal (signal EOF) from switch 236. Each of switches 238 and 239 of FIG. 8C supply their respective output signals to the summer 250, which also receives the input video signal. The summer 250 supplies the modified output signal to the amplifier 240 of FIG. 8A. The summer 250 adds a level shifting voltage based on video content to the end of a video line and/or to selected video lines or line portions in the VBI vicinity. The vertical jitter signal can be a portion of a line of the video signal (e.g., program video) that dynamically goes below blanking level.

Figure 8D:
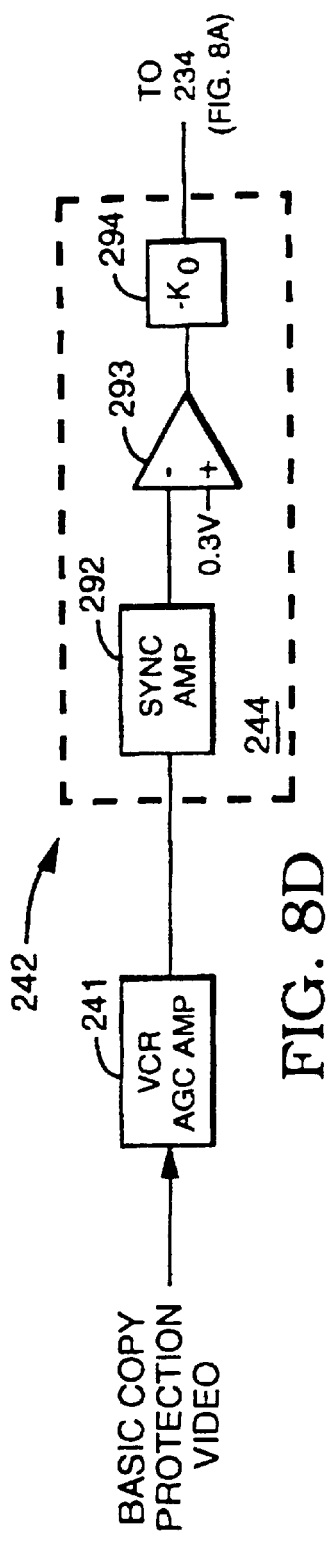
FIG. 8D is a schematic diagram illustrating a modification to the circuit of FIG. 8A.

FIG. 8D illustrates a modification of the circuit 242 of FIG. 8A, wherein the automatic gain control (AGC) response to a preferably varying AGC signal from the basic copy protection signal, can be integrated into the invention. One aspect of the modification, is the increasing of the enhancement that causes tearing when an illegal copy is made. In this simplified block diagram, a basic copy protection signal with modulated AGC pulses is coupled to preferably a typical VCR AGC amplifier such as amplifier 241 of FIG. 8A. Circuit 241 will then have varying levels of video output because of the modulated nature of the AGC pulses. As a result, the sync amplitudes are varying according to the amount of attenuation. Thus, typically, when the AGC pulses are of full effectiveness or cause a maximum effect, the output of a sync amplifier 292 has about one third the normal sync amplitude (for example, about 100 mv). When the AGC pulses are modulated so as to cause very little or no copy protection effect, the output of amplifier 292 has a substantially normal sync amplitude of about 300 mv. The output of amplifier 292 is coupled to a differential amplifier 293 which receives a 300 mv signal at a second input. The amplifier 293 outputs a range of signals from zero to about 200 mv due to the minimum to maximum copy protection effect, which output is then coupled to a scale factor circuit 294 which in turn supplies a voltage level that varies from zero to typically no more than negative 5% white level. The output of minus 5% indicates a lowering of the video portions at the end of a TV line and/or video portions in the lines located in the VBI vicinity by a further negative 5% (for example), when a maximum attenuation of the AGC amplifier is in effect. The output of scale factor circuit 294 is coupled or summed to, for example, a differential amplifier circuit such as the circuit 234 of FIG. 8A.

Figure 8E:
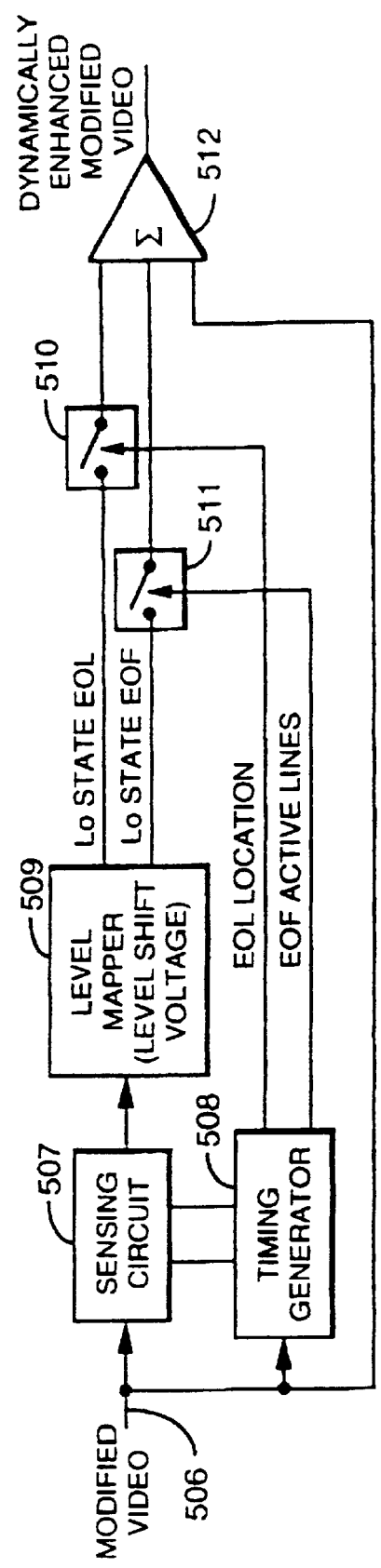
FIG. 8E is a low level block diagram illustrating a modification to the circuits of FIGS. 8A and 8C, in which only the low state EOL and EOF signals are dynamically modified.

The block diagram of FIG. 8E further illustrates how the invention can be practiced by the addition of a level shifting voltage at the locations of EOL and EOF. The modified video signal on input 506 can contain a basic copy protection signal such as Ryan '603 or '098, or Morio '253. Signal 506 can also, but not necessarily contain the enhancement signals such as EOL, EOF, and/or sync narrowing. Signal 506 is coupled to a sensing circuit 507, which senses the video scene content and processes a corresponding signal. This signal is related to the amount of sync clipping at the input of a sync separator or to the relative negative voltage level of a normal back porch, or a normal or modified portion of the back porch, in a video line due for example to the APL in an AC coupled situation. The output of circuit 507 then is supplied to a level mapper circuit 509, which generally provides a more negative voltage output for a low APL, less sync clipping, or less negative back porch voltage in the AC coupled back porch situation. At a higher APL, the output of circuit 509 has a less negative, close to zero, or even a slightly positive voltage, with more sync clipping or more negative back porch voltage in the AC coupled situation. The output voltage(s) of circuit 509 are then gated through substantially the periods of EOL and/or EOF via switching circuits 510 and 511. A summing amplifier 512 receives the voltages from circuits 510, and 511 and shifts down the level of the video (portions) and/or enhancement signals as a function of the video scene content. As should be noted, any backporch sampling should be in a sample area substantially free of the raised or modified portions of the back porch. A timing generator 508 provides a logic high signal during the period near the end of the TV line, such as the EOL location, and during the period during the active line portions (EOF) in the VBI vicinity.

Figure 9A:
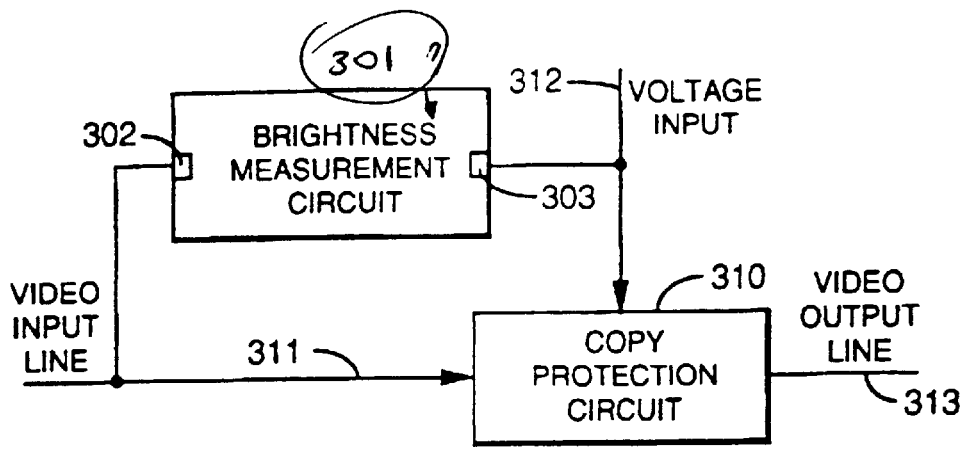
FIG. 9A illustrates, in a high level block diagram, an alternative embodiment for use of a brightness measurement circuit with a copy protection circuit.
Figure 9B:
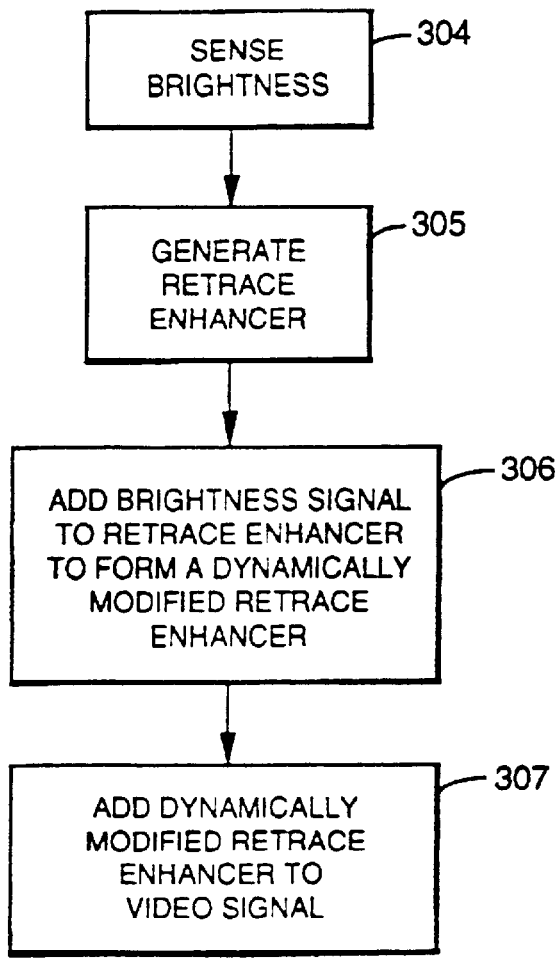
FIG. 9B illustrates, in a flow chart, acts performed to modify a retrace enhancer in the circuit illustrated in FIG. 9A.

The signals illustrated in FIGS. 3A–3C can also be generated by another combination depicted in FIG. 9A, wherein a sensing circuit 301 (e.g. a brightness sensing circuit) that indicates the picture level as illustrated by an act 304 in FIG. 9B, supplies a signal to a copy protection circuit 310 (FIG. 9A) that generates a retrace enhancer (as illustrated by act 305). The circuit 310 adds the signal from circuit 301 to the generated retrace enhancer (as illustrated by act 306) to obtain a dynamically modified retrace enhancer, and thereafter adds the modified retrace enhancer to the video signal (as illustrated by act 307 of FIG. 9B).

Specifically, copy protection circuit 310 (FIG. 9A) has a video input line 311 for receipt of the video signal, a voltage input line 312 having a voltage level that is used by circuit 310 in generating a retrace enhancer, and a video output line 313 for supplying a modified video signal that includes the retrace enhancer. Sensing circuit 301 has an input terminal 302 coupled to video input line 311, and an output terminal 303 coupled to the voltage input line 312. During operation, sensing circuit 301 supplies on output terminal 303 a signal related to scene content carried by the video signal received at terminal 302. Copy protection circuit 310 uses the signal on line 312, which includes the output from terminal 303, to generate a retrace enhancer such as a checker or a gray pattern signal that is added to the video signal to generate a modified video signal supplied on line 313.

Figure 9C:
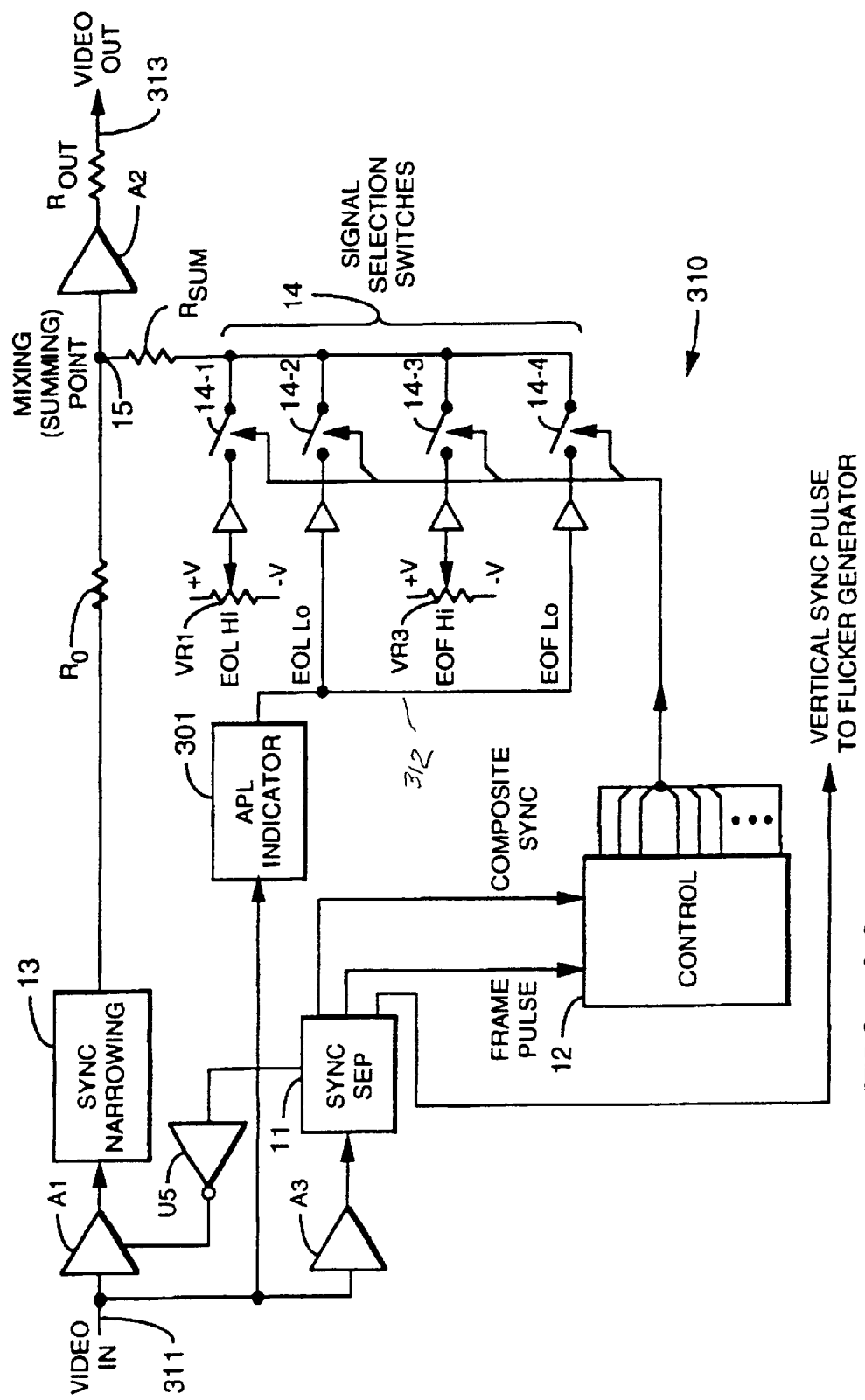
FIG. 9C illustrates, in an intermediate level block diagram, one implementation of the embodiment illustrated in FIG. 9A.

For example, in one embodiment discussed below in reference to FIG. 9C, the copy protection signal includes a checker signal, and circuit 310 uses the signal received on voltage input line 312 to generate a low level for the checker signal. In the embodiment illustrated in FIG. 9C, circuit 310 is implemented in a manner similar to prior art circuit 10 (FIG. 1D) as described in Wonfor '936, except that instead of potentiometers VR2 and VR4, a sensing circuit 301 supplies the low level signal for use in generating a checker signal and a gray pattern added at the end of field. Note however that the potentiometers VR2 and VR4 of FIG. 1D can be used, and the negative terminals –V of these potentiometers can be coupled to the output terminal of circuit 301 (FIG. 9A), thereby permitting manual adjustment as in the prior art. FIG. 9C shows in more detail the concept of the summer 250 configuration of FIG. 8C, wherein resistors Rsum and Ro in FIG. 9C form a circuit such as the summer 250 of FIG. 8C.

Figure 10:
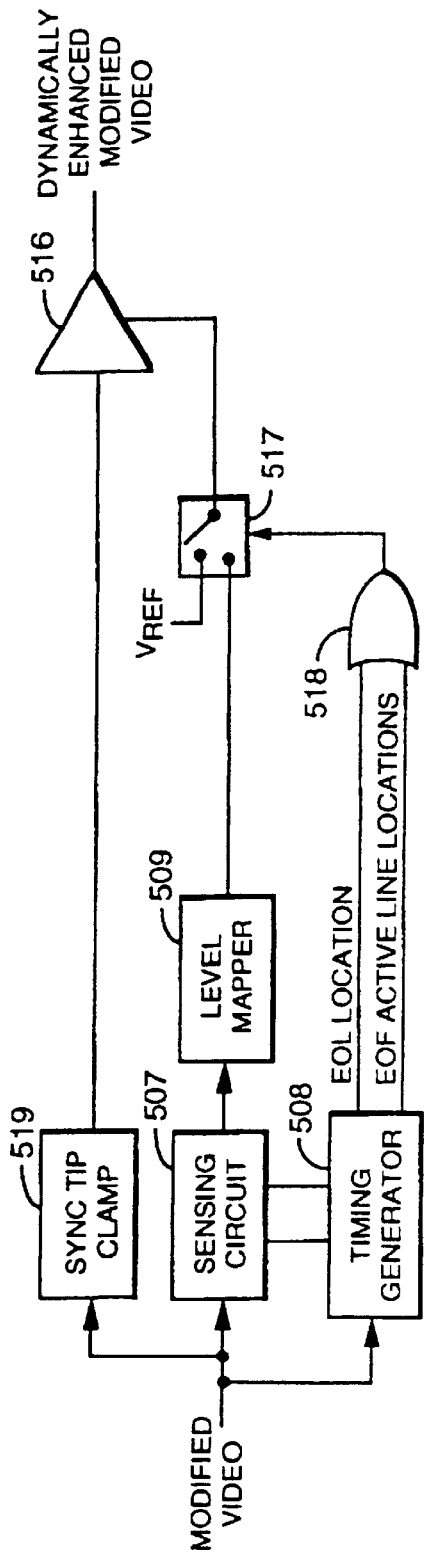
FIG. 10 is a low level block diagram illustrating a further embodiment of the invention.

FIG. 10 shows yet another way of level shifting during the end of TV line and/or active video portions in the VBI vicinity via attenuation of the video portions. Here, the circuits 507, 508 and 509 have been described above. The outputs of timing generator 508 are OR'd via an OR gate 518, whose output is coupled to a switch 517 which also receives a voltage Vref at a second input. During the periods of end of the TV line or active video line portions in the VBI vicinity, the OR gate 518 is logic high to cause a voltage controlled amplifier (VCA) 516 to change gain. This gain change for example would lower the gain during the periods as defined by circuit 508 to cause a lowered video signal and/or copy protection enhancement signal with a darker scene. For brighter scenes, the video periods described above are not as attenuated. With the majority of the video period, the output of OR gate 518 is low and the VCA 516 receives a reference voltage to cause VCA 516 to output a normal video level. One essential element of FIG. 10 is a circuit 519 which receives the input signal and is clamped below blanking level such as sync tip. This allows the attenuation to be effected in the video portion above sync tip. The output of VCA 516 then has attenuated portions of the video signal during the periods in the end of the (selected) TV line (EOL) and/or the video portions of lines (EOF) in the VBI vicinity.

Figure 11:
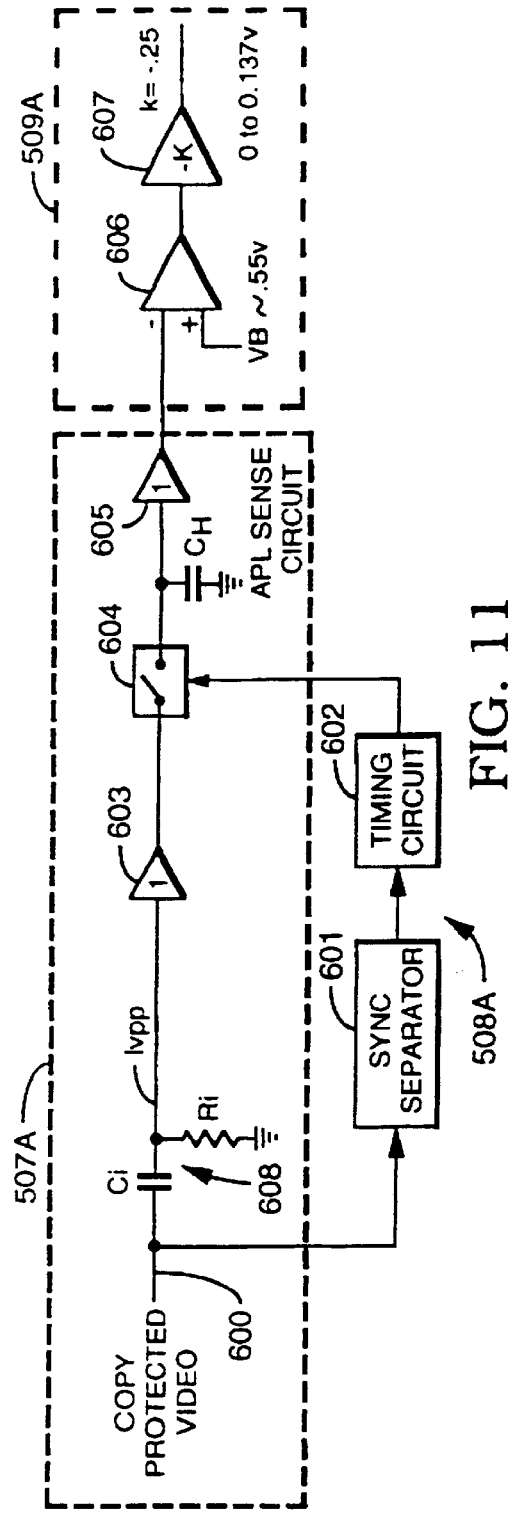
FIG. 11 is a low level block diagram illustrating another embodiment which measures brightness level via an AC coupling circuit.

FIG. 11 illustrates an alternative circuit for measuring the brightness information by AC coupling. Here the copy protected video signal is AC coupled via a high pass filter and as the picture brightness increases, the back porch level goes more negative.

For example, after AC coupling, given a video signal with a 100% white signal, the back porch portion will have a value of about negative 570 millivolts. For a PAL color black signal, the AC coupled back porch voltage will yield about positive 20 millivolts. By sampling a portion of the video signal in the horizontal blanking interval, picture brightness can be related to a line by line voltage such as described above.

Thus the brightness sensing circuit 507 of FIG. 10 is denoted as circuit 507A in FIG. 11. Thus, circuit 507A includes a video source 600, such as one that contains the program video and a basic copy protection signal. Source 600 is coupled to a sync separator circuit 601 and thence to a timing circuit 602 which generates a pulse during an unmodified portion of the normal back porch. Video signal 600 is also coupled to a high pass filter network 608 consisting of Ci and Ri. A typical value of Ci is 1000 uf and of Ri is 150 ohms. Absolute values of these components are not as important as the RC time constant. The output of the high pass filter 608 is buffered by amplifier 603 and coupled to a sample and hold circuit 604 consisting of a switch and a hold capacitor Ch. The sample charges the capacitor Ch during a back porch portion of the video signal. This back porch portion normally excludes any modified back porch regions such as the AGC pulse after a normal sync pulse as described by Ryan '098 or Morio '253. The sample and hold capacitor voltage is then buffered by an amplifier 605 which produces a voltage related to video brightness. The output of amplifier 605 is then fed to a mapping circuit 509A corresponding to the mapper 118 of FIGS. 5A, 7A, etc. Circuit 509A can be some other circuit, but in this case, it consists of a differential amplifier 606 which receives a threshold voltage VB and converts the voltage of amplifier 605 to such a value that an average peak white signal yields about 0 volt and an average black level signal yields about +550 millivolts. The output of amplifier 606 is then inverted and attenuated via a circuit 607 to yield a voltage range of about zero (bright scenes) to about negative 137 millivolts (dark scenes). Alternatively, the timing circuit 602 can be used to sample the horizontal sync tip to avoid modified back porch portions of certain copy protection signals, whereupon the threshold voltage VB is changed to a different voltage required to produce a similar voltage range at the output of the circuit 607. The output of inverter circuit 607 is then an alternative output for the circuit 118 in FIGS. 5A, 7C or circuit 234 of FIGS. 8A, 8C.

Numerous modifications and adaptations of the embodiments described herein will be apparent to the skilled artisan in view of the disclosure. For example, in other embodiments, the changes described above are made in a predetermined manner or in a random manner, instead of being made dynamically based on scene content carried by the video signal. When changed in a predetermined manner, such changes can be made at a predetermined frequency. For example, the low level of a retrace enhancer such as a checker signal, an AGC signal, or a pseudo sync pulse can be changed at a fixed frequency. When changed in a random manner, such changes can be made either in a pseudo-random manner based on a random number generator, or can be made depending on audio content. As another example, in other embodiments, instead of changing an attribute of a pulse in the video signal based on the scene content, the number or the type (or some combination thereof) of the copy protection schemes being used is changed depending on the scene content. For example, a different scheme or an additional scheme can be used to protect a dark scene, as compared to a single protection scheme used for all scenes of the video signal.

In yet another example, instead of changing an added pulse, the lowest level of an existing horizontal sync pulse that is normally present at the end of each line in an active video portion of a video signal, is changed by a sync clipper (as described in, e.g. Wonfor '936) or a negative peak clipper used to reduce sync amplitude and not to remove sync pulse (as described for example in U.S. Pat. No. 4,695,901 to Ryan) as a function of a scene's content (see FIG. 5F). Thus, horizontal sync pulses across multiple frames have varying levels that depend, e.g. on brightness of the to-be-displayed scene (see FIG. 5F). In still another example, a horizontal sync pulse is narrowed or widened as a function of the scene's content, so that horizontal sync pulses across frames (or across lines) have varying width depending on the brightness of the to-be-displayed scene (see processor 403 and variable one shot 405 illustrated in FIG. 8B, as well as FIG. 5E). In another example, the amplitude of an AGC pulse that immediately follows a trailing edge of a horizontal sync pulse is changed depending on the brightness of the to-be-displayed scene.

Also, retrace enhancers can be adapted not only to the picture level, but also to a dynamic process (see Ryan '603 patent). The dynamic process consists of turning on and off the copy protection process by varying and/or modifying the AGC, and/or pseudo sync and/or horizontal sync pulses as a function of time. One example of the dynamic process includes amplitude modulating the AGC pulses. When the AGC pulse are near blanking level, the copy protection process is essentially off. Therefore, in this example, the TV can sense the attenuating effect of the AGC and pseudo syncs and/or horizontal syncs, and also respond to the modified retrace enhancers appropriately (i.e. by retracing). For example, if the AGC pulses are at blanking level, the retrace enhancers (i.e., checker or vertical jitter signals) may be attenuated and/or eliminated for better view-ability.

In another example, instead of using a single APL indicator 301 (as illustrated in FIG. 9C), two sensors (not shown) can be individually coupled to each of the respective low level input lines, namely the checker low level line coupled to switch 14-2, and the end of field low level input line coupled to switch 14-4.

Also, as noted above, a brightness measurement circuit 52 (FIG. 2A) can be coupled to a copy protection circuit 50 either to supply a signal thereto (e.g. to supply a low voltage signal used in generating a retrace enhancer) or to receive a signal therefrom (e.g. to receive the copy protected signal, whereby a retrace enhancer already included in the copy protected signal is modified by level shifting as described herein). Instead of an APL indicator, any other device that uses a signal related to scene content can be substituted therefor.

Accordingly, various such modifications and adaptations of the embodiments and examples described herein are encompassed by the attached claims.

What is claimed is:

1. A method of enhancing copy protection or providing dynamic copy protection of a video signal, the method comprising:

receiving the video signal;

providing an attribute of a copy protection process in the video signal; and dynamically modifying the attribute of the copy protection process in at least a video line of the video signal based on scene content while maintaining at least a portion of the copy protection activated, to enhance or provide the dynamic copy protection.

2. The method of claim 1, wherein the dynamic modification to the attribute is related to brightness or scene content in at least a line in the video signal.

3. The method of claim 2 further comprising:

sensing an average picture level of the scene content prior to said modifying; and said modifying includes adding to the video signal a signal related to the average picture level.

4. The method of claim 1 wherein the attribute being modified is a low level of a retrace enhancer, said retrace enhancer causing a retrace during display of an attenuated version of the video signal at a time different from occurrence of a normal synchronization signal in the video signal.

5. The method of claim 4 wherein the modifying includes:

modifying the low level to below a blanking level of the video signal when the scene content is darker than average.

6. The method of claim 4 wherein the modifying includes:

modifying the low level to above a blanking level of the video signal when the scene content is brighter than average.

7. The method of claim 4 wherein:

the synchronization signal is a horizontal synchronization signal; and the retrace enhancer includes a checker pattern formed by a plurality of transitions in overscan portions of a plurality of lines in a field of the video signal.

8. The method of claim 4 wherein:

the synchronization signal is a vertical synchronization signal; and the retrace enhancer includes in addition to said low level, a high level of a gray pattern, each of said high level and said low level being added at about the end of a field in the video signal.

9. The method of claim 1 wherein the attribute is the width of a synchronization signal normally present in the video signal.

10. The method of claim 9 wherein the modifying includes:

narrowing the width of the synchronization signal for a darker than average scene content to a width smaller than the width of the synchronization signal for a brighter than average scene content.

11. A method of enhancing copy protection or providing dynamic copy protection of a video signal the method comprising:

generating a retrace enhancer of a type for indicating a non-normal retrace in an attenuated version of the video signal; and modifying the retrace enhancer based on scene content in at least a line in the video signal while maintaining at least a portion of the copy protection activated.

12. The method of claim 11 wherein the modifying includes:
adding to the video signal a signal related to scene content, thereby level shifting the retrace enhancer.
13. The method of claim further comprising:
adding the retrace enhancer to the video signal prior to said modifying; and
adding to said video signal a signal related to scene content during said modifying.
14. The method of claim 11 further comprising:
adding to said retrace enhancer a signal related to the scene content during said modifying to generate a modified retrace enhancer; and
adding said modified retrace enhancer to said video signal.
15. The method of claim 11 wherein:
the retrace enhancer includes a checker pattern formed by a plurality of transitions in overscan portions of a plurality of consecutive lines of the video signal.
16. The method of claim 11 wherein:
the retrace enhancer includes a gray pattern formed by a high level added to a first line at about the end of a first field of the video signal, and also includes a low level added to a second line at about the end of a second field of the video signal.
17. The method of claim 11 wherein:
the retrace enhancer includes a synchronization signal; and
the act of modifying includes narrowing a width of the synchronization signal.
18. An apparatus for enhancing copy protection, or providing dynamic copy protection of a video signal when a copy of the video signal is played, wherein the video signal includes a retrace enhancer and a synchronizing signal, the apparatus comprising:
a sensing circuit having a video input for receipt of the video signal and an indicator output terminal for dynamically supplying a voltage level related to scene content in the copy protected video signal;
a timing generator coupled to the video input and including a timing output terminal, for supplying a control pulse in the presence of a retrace enhancer in the copy protected video signal; and
means for combining the retrace enhancer, modified in accordance with the scene content, with the video signal in response to the control pulse, to enhance or provide the copy protection.
19. The apparatus of claim 18 wherein:
the sensing circuit includes a measurement circuit for dynamically generating a voltage level from the scene content or picture brightness level, or from an amplitude of the synchronizing signal; and
the means for combining include a switch circuit for supplying the dynamic voltage level in response to the control pulse.
20. The apparatus of claim 19 wherein the measurement circuit includes:
an average picture level sensor coupled to the video input for supplying an initial voltage signal in response to the scene content, brightness or synchronizing signal amplitude; and
a level mapper circuit for generating the voltage level in response to the initial voltage signal.
21. The apparatus of claim 19 wherein the measurement circuit includes:
a sync amplitude sensor coupled to the video input for supplying an initial voltage signal in response to the sync amplitude; and
a level mapper circuit coupled to the sync amplitude sensor for generating the voltage level in response to the initial voltage signal.
22. The apparatus of claim 21 wherein the sync amplitude sensor includes:
a sync separator circuit coupled to the video input;
a sample and hold circuit coupled to the sync separator circuit;
a differential amplifier coupled to the sample and hold circuit to receive therefrom a plurality of voltage levels; and
the level mapper circuit being coupled to an output of the differential amplifier.
23. The apparatus of claim 22 wherein the sync separator circuit includes:
a first sync separator responsive to a sample and hold circuit; and
a second sync separator responsive to a second sample and hold circuit.
24. The apparatus of claim 22 wherein the plurality of voltage levels include a sync tip voltage and/or a back porch voltage.
25. The apparatus of claim 19 wherein the measurement circuit includes:
a level mapper circuit including an inverting amplifier, for supplying the voltage level to the switch circuit.
26. The apparatus of claim 19 wherein the measurement circuit includes:
a level mapper circuit including an analog to digital converter, a memory coupled to the converter, and a digital to analog converter coupled to the memory, for supplying the voltage level to the switch circuit.
27. The apparatus of claim 19 including:
means; responsive to the sensing circuit, for generating a new synchronizing signal whose width is dynamically narrowed as a function of the scene content; and
a second switch circuit integral with the combining means, for combining the dynamically narrowed new synchronizing signal with the previously dynamically enhanced video signal.
28. The apparatus of claim 27 including:
timing circuitry responsive to the timing generator for providing a new sync and color burst gate signal;
means for supplying a new color burst along with the new synchronizing signal; and
wherein the second switch circuit combines the dynamically narrowed new synchronizing signal and new color burst with the video signal in response to the new sync and color burst gate signal.
29. The apparatus of claim 28 wherein the means for generating includes a processor circuit responsive to the scene content, and a variable timing duration circuit coupled to the processor means.
30. The apparatus of claim 19 wherein the means for combining includes summing means for adding the voltage level to the video signal during the retrace enhancer.
31. The apparatus of claim 19 wherein the means for combining includes the switch circuit for inserting the voltage level into the video signal during the retrace enhancer.
32. The apparatus of claim 19 including:
level mapping circuit integral with the measurement circuit for generating the voltage level indicative of the scene content or brightness, or the synchronization signal amplitude;

a summer coupled to the level mapping circuit for supplying a selected low bias signal;

an end of line (EOL) switch and an end of field (EOF) switch coupled to the summer for supplying a high or low EOL voltage in response to an EOL frequency, and for supplying a high or low EOF voltage in response to an EOF frequency, respectively; and switching circuits coupled to the EOL and EOF switches for combining the high or low EOL or EOF voltages with respective retrace enhancers in the video signal in response to corresponding EOL and EOF timing signals.

33. The apparatus of claim 18 wherein:

the retrace enhancer includes a checker signal at the end of selected lines in the copy protected video signal.

34. The apparatus of claim 18 wherein:

the retrace enhancer includes a gray pattern signal at the end of a field in the copy protected video signal.

35. An apparatus for enhancing copy protection, or providing dynamic copy protection, of a video signal, the apparatus comprising:

a copy protection circuit for applying copy protection to the video signal in the form of retrace enhancers;

a measurement circuit coupled to the copy protection circuit for dynamically supplying a voltage level indicative of the average picture level (APL) of the video signal; and means for combining the dynamic voltage level with the retrace enhancers to further enhance the copy protection or to provide dynamic copy protection.

36. The apparatus of claim 35 wherein:

the copy protection circuit applies an initial voltage signal in generating the retrace enhancers;

the measurement circuit supplies the dynamic voltage level to the means for combining via a voltage input line; and the dynamic voltage level is a function of the average picture level of scene content carried by the copy protected video signal.

37. The apparatus of claim 35 wherein:

the measurement circuit supplies a low voltage level which is a dynamic function of the APL, for selective combination with an end of line checker signal included in the copy protected video signal.

38. The apparatus of claim 37 wherein:

the measurement circuit further supplies a high voltage level which is a dynamic function of the APL, for selective combination with a gray pattern signal included in the copy protected video signal, wherein the low and high voltage levels are combined with respective retrace enhancers at the end of field of the video signal.

39. The apparatus of claim 35 wherein the means for combining include:

means responsive to the copy protected video signal, for providing timing signals indicative of end of line (EOL) and end of field (EOF) periods of the respective EOL and EOF retrace enhancers in the copy protected video signal; and for initiating the combining of the dynamic voltage level with the respective retrace enhancers in response to the associated EOL and EOF timing signals.

40. The apparatus of claim 39 wherein the measurement circuit includes:

a sensing circuit for supplying an initial voltage signal indicative of the APL of the copy protected video signal; and a level mapping circuit coupled to the sensing circuit for supplying the voltage level to the means for combining in response to the initial voltage signal.

41. The apparatus of claim 40 wherein the level mapping circuit includes an inverter circuit.

42. The apparatus of claim 40 wherein the level mapping circuit includes an analog to digital converter, a memory coupled to the converter, and a digital to analog converter coupled to the memory.

43. The apparatus of claim 35 wherein:

the measurement circuit includes a scene content measuring circuit which measures the APL in terms of the brightness or scene content of the video signal; and the means for combining include means for providing timing signals indicative of the occurrence of the retrace enhancers in the copy protected video signal.

44. The apparatus of claim 43 wherein the scene content measuring circuit includes:

an APL indicator circuit receiving the copy protected video signal for providing low level signals as a function of the APL;

means for providing high level signals as a function of the APL;

signal selection switches for selecting one or more low or high level signals in response to the means for providing; and means responsive to the signal selection switches for combining the selected low or high level signals with the copy protected video signal.

45. The apparatus of claim 43 wherein the scene content measuring circuit includes:

means for filtering the copy protected video source;

a sampling circuit coupled to the filtering means for providing a sample level related to the APL during a back porch portion of the video signal; and a level mapper circuit including an inverter circuit for supplying the voltage level indicative of the APL to the means for combining.

46. The apparatus of claim 43 wherein:

the means for combining include a switch circuit coupled at inputs to the measurement circuit and to a voltage Vref, and responsive to the means for providing for passing one of the inputs thereto as the voltage level;

a clamp circuit for clamping the copy protected video signal below blanking level; and a voltage controlled amplifier coupled to the clamp circuit and responsive to the voltage level from the switch circuit.

47. The apparatus of claim 35 wherein:

the measurement circuit includes a sync amplitude sensing circuit which measures the APL in terms of the amplitude of a synchronizing signal in the video signal; and the means for combining include means for providing timing signals indicative of the occurrence of the retrace enhancers in the copy protected video signal.

48. The apparatus of claim 47 wherein the measurement circuit includes:

a sync separator for determining the synchronizing signal amplitude; and a voltage level sampling circuit responsive to the sync separator for supplying the voltage level.

49. The apparatus of claim 48 wherein the voltage level sampling circuit includes:

sample and hold circuits coupled to the sync separator for supplying back porch and synchronizing signal tip voltage levels;

an amplifier responsive to the sample and hold circuits; and a level mapper responsive to the amplifier for supplying the voltage level.

50. A method of enhancing copy protection, or providing dynamic copy protection of a video signal the method comprising:

dynamically modifying, in response to an average picture level of the video signal, an attribute of the copy protection process carried by the video signal; and combining the dynamically modified attribute with the copy protection process to provide a dynamically enhanced copy protection process.

51. The method of claim 50 wherein the attribute comprises checker signals, synchronizing signal narrowing, vertical jitter signals, synchronizing signal amplitude changes and/or level shifting of a portion of at least a line, wherein the attributes are modified differently depending on the average picture level in at least a line in the video signal.

52. The method of claim 50 wherein the step of dynamically modifying includes:

continuously sensing the average picture level of the video signal;

detecting the occurrence of the attribute in the video signal; and modifying the detected attribute in response to the sensed average picture level.

53. The method of claim 52 wherein the video signal includes a synchronizing signal:

wherein the step of continuously sensing includes dynamically measuring the average picture level as a function of the video signals brightness level, scene content or synchronizing signal amplitude.

\* \* \* \* \*